US012793601B2

(12) United States Patent
Jin et al.

(10) Patent No.: US 12,793,601 B2
(45) Date of Patent: Nov. 10, 2026

(54) DISPLAY PANEL, DRIVING METHOD THEREOF AND DISPLAY DEVICE

(71) Applicant: Shanghai AVIC OPTO Electronics Co., Ltd., Shanghai (CN)

(72) Inventors: Huijun Jin, Shanghai (CN); Linzhi Wang, Shanghai (CN); Haotian Lu, Shanghai (CN)

(73) Assignee: Shanghai AVIC OPTO Electronics Co., Ltd., Shanghai (CN)

( * ) Notice: Subject to any disclaimer, the term of this patent is extended or adjusted under 35 U.S.C. 154(b) by 294 days.

(21) Appl. No.: 18/409,012

(22) Filed: Jan. 10, 2024

(65) Prior Publication Data

US 2025/0061834 A1 Feb. 20, 2025

(30) Foreign Application Priority Data

Aug. 14, 2023 (CN) ........................ 202311021001.X

(51) Int. Cl.
*G09G 3/20* (2006.01)
*G09G 3/36* (2006.01)

(52) U.S. Cl.
CPC ............. *G09G 3/2092* (2013.01); *G09G 3/20* (2013.01); *G09G 3/3677* (2013.01); *G09G 2310/0267* (2013.01); *G09G 2310/0278* (2013.01); *G09G 2330/021* (2013.01)

(58) Field of Classification Search
CPC ...... G09G 3/20; G09G 3/2092; G09G 3/3677; G09G 2310/0267; G09G 2310/0278; G09G 2330/021
See application file for complete search history.

(56) References Cited

U.S. PATENT DOCUMENTS

| | | | | |
|---|---|---|---|---|
| 2009/0284706 A1* | 11/2009 | Liu | G02F 1/1362 349/149 |
| 2011/0116592 A1* | 5/2011 | Tsai | G11C 19/184 377/79 |
| 2013/0278324 A1* | 10/2013 | Kaneyasu | H03K 3/012 327/390 |
| 2016/0351140 A1* | 12/2016 | Xiao | G09G 3/3677 |
| 2022/0108666 A1* | 4/2022 | Watanabe | G02F 1/1368 |

FOREIGN PATENT DOCUMENTS

| | | |
|---|---|---|
| CN | 101060334 A | 10/2007 |
| CN | 101078823 A | 11/2007 |
| CN | 105551421 B | 8/2019 |
| CN | 109037242 B | 4/2021 |
| CN | 113348501 A | 9/2021 |

* cited by examiner

*Primary Examiner* — William Boddie
*Assistant Examiner* — Saifeldin E Elnafia
(74) *Attorney, Agent, or Firm* — Anova Law Group, PLLC

(57) ABSTRACT

Display panel, driving method thereof and display device are provided. The display panel includes a display area and a non-display area. The display area includes a plurality of pixel units and a plurality of gate lines electrically connected to the plurality of pixel units. The non-display area includes a boost circuit including a plurality of boost units. A boost unit of the plurality of the boost units includes a charging module, a bootstrap module, and an initialization module that are electrically connected. The bootstrap module at least includes a first module and a first capacitor.

18 Claims, 20 Drawing Sheets

DISPLAY PANEL, DRIVING METHOD THEREOF AND DISPLAY DEVICE

CROSS-REFERENCE TO RELATED APPLICATION

This application claims priority of Chinese Patent Application No. 202311021001.X, filed on Aug. 14, 2023, the entire contents of which are hereby incorporated by reference.

FIELD OF THE DISCLOSURE

The present disclosure generally relates to the field of display technology and, more particularly, relates to a display panel, a driving method thereof and a display device.

BACKGROUND

In the field of display technology, a pixel array of a display panel usually includes a plurality of rows of gate lines and a plurality of columns of data lines that are insulated across the plurality of rows of gate lines. Generally, driving of the plurality of rows of gate lines can be achieved through a bonded integrated circuit (IC).

At present, a gate line potential for some display devices can generally be provided directly by an IC. As customers' demand for high potential levels for data writing increases, both upper and lower gate line potentials must further increase and decrease. Consequently, a potential difference that the IC needs to provide becomes larger, a driving capability required by the IC increases, and a power consumption also grows.

Therefore, how to avoid wasting power consumption when driving a display panel is an urgent technical problem to be solved by a person skilled in the art.

BRIEF SUMMARY OF THE DISCLOSURE

One aspect of the present disclosure provides a display panel. The display panel includes a display area and a non-display area. The display area includes a plurality of pixel units and a plurality of gate lines electrically connected to the plurality of pixel units. The non-display area includes a boost circuit including a plurality of boost units, a boost unit of the plurality of boost units is electrically connected to at least one of the plurality of gate lines. The boost unit of the plurality of the boost units includes a charging module, a bootstrap module, and an initialization module that are electrically connected, the bootstrap module at least includes a first module and a first capacitor. A control end of the charging module is electrically connected to the first control signal line, a first end of the charging module is electrically connected to a control end of the charging module, and a second end of the charging module is electrically connected to a gate line, a control end of the first module, and a first electrode of the first capacitor respectively. A first end of the first module is electrically connected to a second control signal line, and a second end of the first module is electrically connected to a second electrode of the first capacitor. A control end of the initialization module is electrically connected to the first control signal line, a first end of the initialization module is electrically connected to a second electrode of the first capacitor, and a second end of the initialization module is electrically connected to a first negative potential signal line. A potential value provided by the second control signal line is greater than a potential value provided by the first negative potential signal line.

One aspect of the present disclosure provides a driving method of the display panel. The driving method includes a charging stage and a bootstrap stage. In the charging stage, the first control signal provided by the first control signal line controls the first end and the second end of the charging module to be conductive, the first control signal provided by the first control signal line controls the first end and the second end of the initialization module to be conductive. In the bootstrap stage, the first control signal value controls the first end and the second end of the first module to be conductive.

Another aspect of the present disclosure provides a display device including a display panel. The display panel includes a display area and a non-display area. The display area includes a plurality of pixel units and a plurality of gate lines electrically connected to the plurality of pixel units. The non-display area includes a boost circuit including a plurality of boost units, a boost unit of the plurality of boost units is electrically connected to at least one of the plurality of gate lines. The boost unit of the plurality of the boost units includes a charging module, a bootstrap module, and an initialization module that are electrically connected, the bootstrap module at least includes a first module and a first capacitor. A control end of the charging module is electrically connected to the first control signal line, a first end of the charging module is electrically connected to a control end of the charging module, and a second end of the charging module is electrically connected to a gate line, a control end of the first module, and a first electrode of the first capacitor respectively. A first end of the first module is electrically connected to a second control signal line, and a second end of the first module is electrically connected to a second electrode of the first capacitor. A control end of the initialization module is electrically connected to the first control signal line, a first end of the initialization module is electrically connected to a second electrode of the first capacitor, and a second end of the initialization module is electrically connected to a first negative potential signal line. A potential value provided by the second control signal line is greater than a potential value provided by the first negative potential signal line.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated into and constitute a part of the present specification, illustrate embodiments of the present disclosure and together with the description, serve to explain principles of the present disclosure.

DETAILED DESCRIPTION

Various exemplary embodiments of the present disclosure will be described in detail with reference to the accompanying drawings. It should be noted that, unless specifically stated otherwise, a relative arrangement of components and steps, numerical expressions and numerical values set forth in the embodiments do not limit the scope of the present disclosure.

The following description of at least one exemplary embodiment is merely illustrative and is not intended to limit the present disclosure and application or use thereof.

Techniques, methods, and apparatus known to a person skilled in the art may not be discussed in detail, but where appropriate, such techniques, methods, and apparatus should be considered as part of the present specification.

In all examples shown and discussed herein, any specific value should be construed as illustrative only and not as a limitation. Accordingly, other examples of exemplary embodiments may have different values.

It will be apparent to a person skilled in the art that various modifications and variations can be made in the present disclosure without departing from the spirit or scope of the present disclosure. Accordingly, the present disclosure is intended to cover the modifications and variations of the present disclosure that fall within the scope of corresponding claims (claimed technical solutions) and equivalents thereof. It should be noted that implementations provided in the embodiments of the present disclosure may be combined with each other if there is no contradiction.

It should be noted that similar numerals and letters refer to similar items in the following accompanying drawings. Once an item is defined in one accompanying drawing, the item does not require further discussion in subsequent accompanying drawings.

Figure 1:
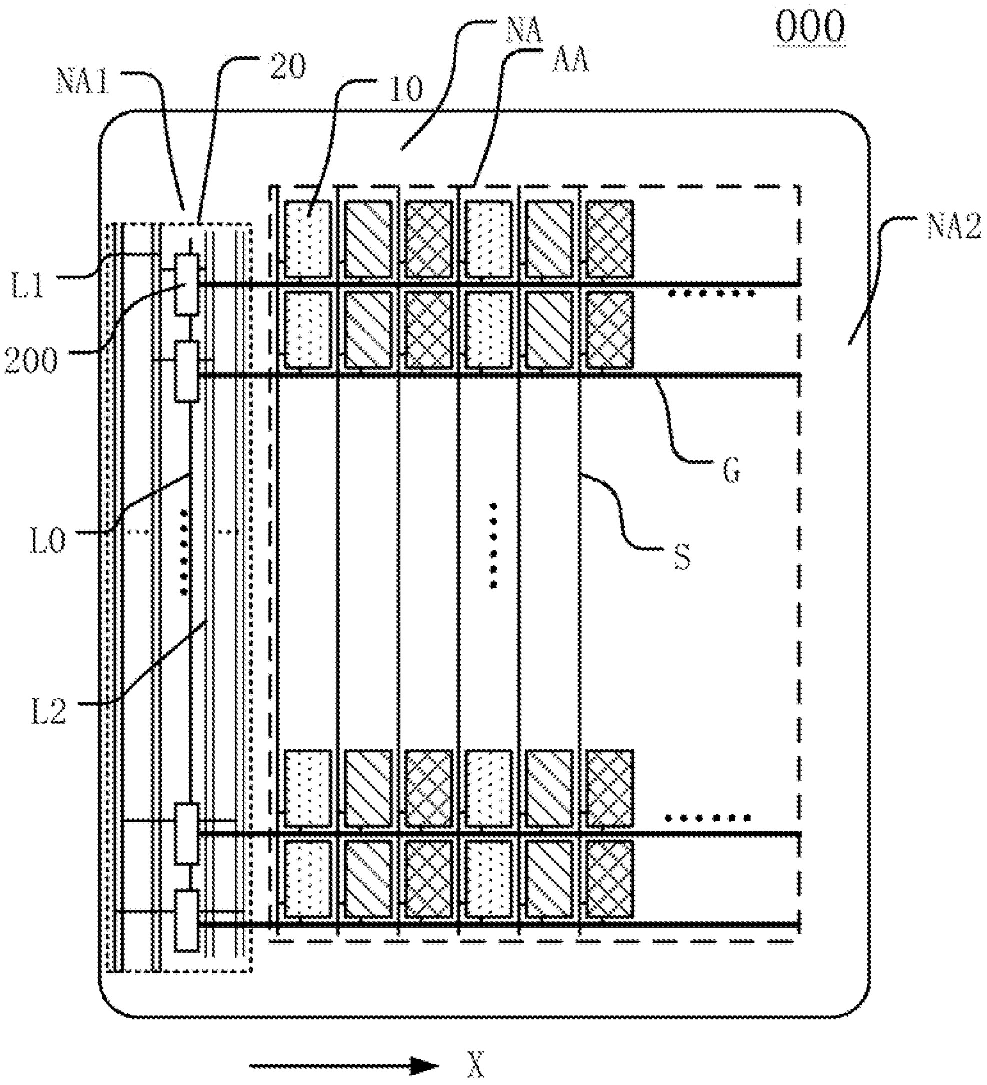
FIG. 1 illustrates a planar view of a display panel consistent with various embodiments of the present disclosure.
Figure 2:
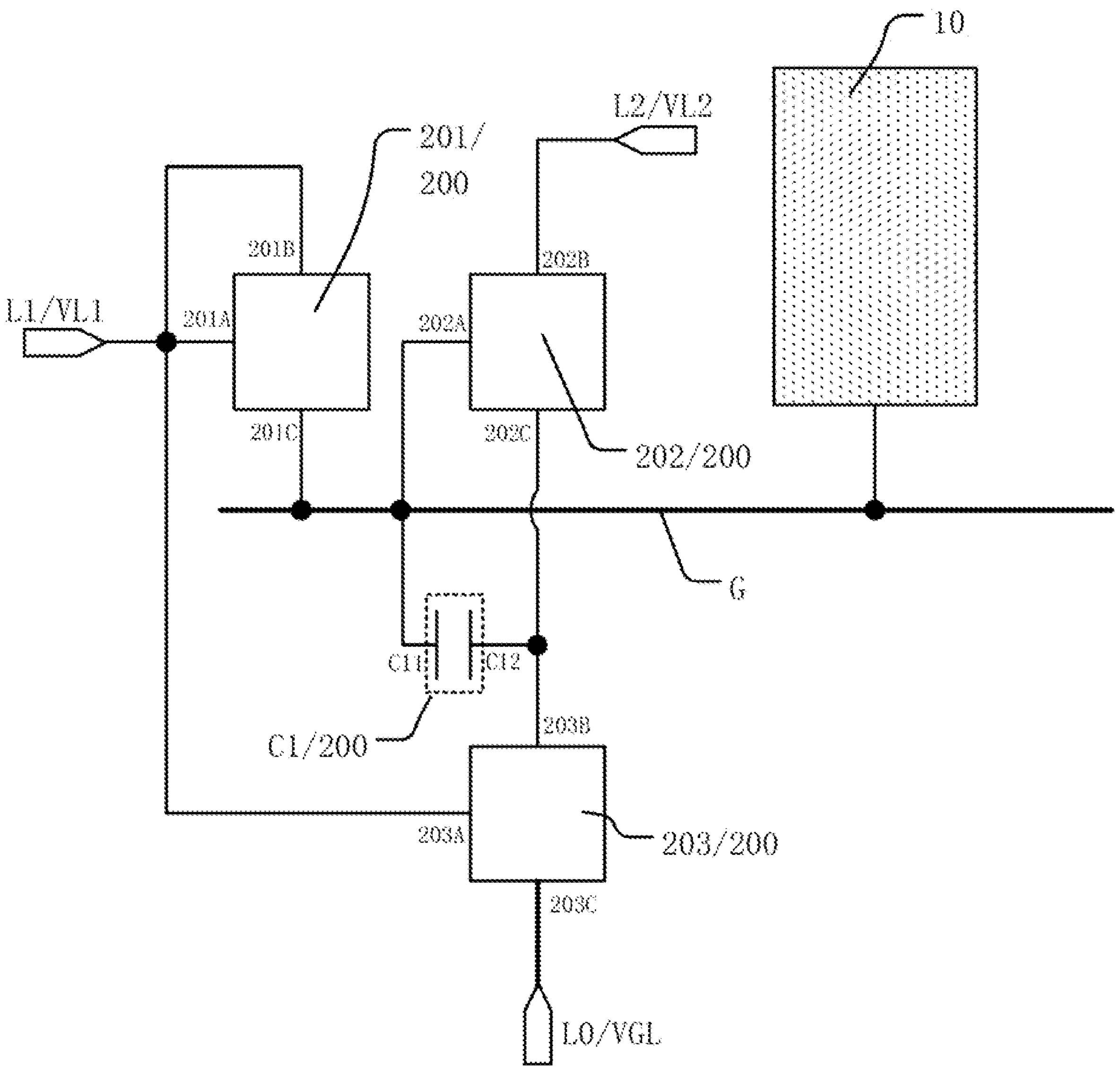
FIG. 2 illustrates an electrical connection diagram between boost units and pixel units in FIG. 1.

FIG. 1 illustrates a planar view of a display panel consistent with various embodiments of the present disclosure. FIG. 2 illustrates an electrical connection diagram between boost units and pixel units in FIG. 1. Referring to FIG. 1 and FIG. 2, in one embodiment, a display panel 000 includes a display area AA and a non-display area NA. The display area AA includes a plurality of pixel units 10 and a plurality of gate lines G electrically connected to the plurality of pixel units 10. The non-display area NA includes a boost circuit 20. The boost circuit 20 includes a plurality of boost units 200. A boost unit 200 is electrically connected to at least one gate line G. The plurality of boost units 200 includes a charging module 201, a bootstrap module, and an initialization module 203 that are electrically connected. The bootstrap module at least includes a first module 202 and a first capacitor C1. A control end 201A of the charging module 201 is electrically connected to a first control signal line L1, and a first end 201B of the charging module 201 is electrically connected to the control end 201A of the charging module 201. A second end 201C of the charging module 201 is electrically connected to a gate line G, a control end 202A of the first module 202, and a first electrode C11 of the first capacitor C1 respectively. A first end 202B of the first module 202 is electrically connected to a second control signal line L2, and a second end 202C of the first module 202 is electrically connected to a second electrode C12 of the first capacitor C1. A control end 203A of the initialization module 203 is electrically connected to the first control signal line L1, a first end 203B of the initialization module 203 is electrically connected to the second electrode C12 of the first capacitor C1, and a second end 203C of the initialization module 203 is electrically connected to a first negative potential signal line L0. A potential value provided by the second control signal line L2 is greater than a potential value provided by the first negative potential signal line L0.

Specifically, in the embodiment, the display panel 000 includes a display area AA and a non-display area NA. The display area AA includes a plurality of pixel units 10 and a plurality of gate lines G electrically connected to the plurality of pixel units 10. Optionally, the display area AA of the display panel 000 may also include a plurality of data lines S that are insulated across the plurality of gate lines G. A pixel unit 10 may generally include a switching transistor. A potential transmitted on the plurality of gate lines G can control switching transistors in the plurality of pixel units 10 in a corresponding row to be turned on sequentially. The plurality of data lines S provides data signals to the plurality of pixel units 10 in a corresponding row to generate a grayscale potential required for displaying each grayscale of an image in each pixel unit 10, thereby realizing a display of a frame of image.

In some current display devices such as electronic display devices, driving of the gate lines can be achieved through an integrated circuit (IC, not shown) that is subsequently bound to the display panel 000. That is, a gate line potential can generally be directly provided by the IC. For example, if an IC offers an upper potential of 25V and a lower potential of −25V, a gate line potential ranges from 25V to −25V. Due to an impact of a potential drop and a threshold potential of a switching transistor, a gate potential required to turn on the switching transistor in the pixel unit 10 needs always to be greater than a positive potential of a data line. For example, for an N-type switching transistor, a gate potential of the switching transistor needs to be greater than a potential provided by a data line of a source/drain thereof to turn on the switching transistor. A gate potential required to turn off the switching transistor in the pixel unit 10 needs to be lower than a negative potential of a data line. For example, for an N-type switching transistor, a gate potential of the switching transistor needs to be less than a potential provided by a data line of a source/drain thereof to turn off the switching transistor. Therefore, when a data line holds a positive potential, a gate potential of the switching transistor in the pixel unit 10 needs to be greater than a positive potential of the data line to maintain a turning-on state. When the data line holds a negative potential, the gate potential of the switching transistor in the pixel unit 10 needs to be lower than a negative potential of the data line to maintain a turning-off state. Therefore, as customers' demands for high potential levels for data writing increase, an upper potential of a gate line must increase, and a lower potential of the gate line must decrease. Consequently, a potential difference that the IC needs to provide becomes larger, a driving capability required by the IC increases, and a power consumption also grows.

To solve the above problem, in the embodiment, the non-display area NA includes a boost circuit 20 arranged in the non-display area NA, which can prevent a setting of the boost circuit 20 from affecting a display screen of the display area AA. The boost circuit 20 includes a plurality of boost units 200, a boost unit 200 is electrically connected to at least one gate line G. Each boost unit 200 in the boost circuit 20 is configured to boost a potential transmitted on a gate line G, that is, a low potential can be input to the boost unit 200 and a high potential can be output from the boost unit 200 to the gate line G.

Specifically, the boost units 200 may at least include a charging module 201, a bootstrap module, and an initialization module 203 that are electrically connected. The bootstrap module at least includes a first module 202 and a first capacitor C1. A control end 203A of the initialization module 203 is electrically connected to the first control signal line L1, the first end 203B of the initialization module 203 is electrically connected to a second electrode C12 of the first capacitor C1, and the second end 203C of the initialization module 203 is electrically connected to a first negative potential signal line L0, a conduction between the first end 203B and the second end 203C of the initialization module 203 can be controlled by the first control signal value provided by the first control signal line L1. When the first end 203B of the initialization module 203 is connected to the second end 203C of the initialization module 203 under a control of the first control signal value provided by the first control signal line L1, a first negative potential signal value VGL provided by the first negative potential signal line L0 can be transmitted to the second electrode C12 of the first capacitor C1, so that when the boost unit 200 of the boost circuit 20 is in a charging state, a potential signal value on the second pole C12 of the first capacitor C1 is the first negative potential signal value VGL provided by the first negative potential signal line L0. Optionally, the first negative potential signal value VGL may be negative.

The control end 201A of the charging module 201 is electrically connected to the first control signal line L1, the first end 201B of the charging module 201 is electrically connected to the control end 201A of the charging module 201, and the second end 201C of the charging module 201 is electrically connected to the gate line G. A conduction between the first end 201B and the second end 201C of the charging module 201 can be controlled by the first control signal provided by the first control signal line L1. When the first end 201B and the second end 201C of the charging module 201 are conductive under the control of the first control signal value provided by the first control signal line L1, the first control signal value provided by the first control signal line L1 may be transmitted to the gate line G.

The second end 201C of the charging module 201 is also electrically connected to the first electrode C11 of the first capacitor C1. Under the control of the first control signal value provided by the first control signal line L1, the conduction between the first end 201B and the second end 201C of the charging module 201 can be controlled. When the first end 201B and the second end 201C of the charging module 201 are conductive under the control of the first control signal value provided by the first control signal line L1, the first control signal value provided by the first control signal line L1 can be transmitted to the first electrode C11 of the first capacitor C1, so that a potential signal value on the first electrode C11 of the first capacitor C1 is the first control signal value provided by the first control signal line L1. Optionally, the embodiment does not limit the first control signal. When the transistor included in the charging module 201 is an N-type transistor, the first control signal value may be positive, when the transistor included in the charging module 201 is a P-type transistor, the first control signal value may be negative, which can be arranged according to actual conditions during specific implementations.

The second end 201C of the charging module 201 is also electrically connected to the control end 202A of the first module 202. Under the control of the first control signal value provided by the first control signal line L1, the conduction between the first end 201B and the second end 201C of the charging module 201 can be controlled. Under the control of the first control signal value provided by the first control signal line L1, when the first end 201B and the second end 201C of the charging module 201 are conductive, the first control signal value provided by the first control signal line L1 can be transmitted to the control end 202A of the first module 202. That is, the first control signal value provided by the first control signal line L1 can control a conduction between the first end 202B and the second end 202C of the first module 202. The first end 202B of the first module 202 is electrically connected to the second control signal line L2, and the second end 202C of the first module 202 is electrically connected to the second electrode C12 of the first capacitor C1. Therefore, under the control of the first control signal value provided by the first control signal line L1, the first end 201B and the second end 201C of the charging module 201 are electrically connected. The first control signal value provided by the first control signal line L1 can be transmitted to the control end 202A of the first module 202. The first control signal value provided by the first control signal line L1 can further control the conduction between the first end 202B and the second end 202C of the first module 202, and a second control signal value provided by the second control signal line L2 electrically connected to the first end 202B of the first module 202 can be transmitted to the second electrode C12 of the first capacitor C1 electrically connected to the second end 202C of the first module 202, so that the potential signal value on the second electrode C12 of the first capacitor C1 is the second control signal value provided by the second control signal line L2. Optionally, the embodiment does not limit the second control signal value provided by the second control signal line L2. When the transistor included in the first module 202 is an N-type transistor, the second control signal value may be positive, and when the transistor included in the first module 202 is a P-type transistor, the second control signal value may be a negative value, which can be arranged according to actual conditions during specific implementations.

In the embodiment, the potential value provided by the second control signal line L2 is greater than the potential value provided by the first negative potential signal line L0. That is, no matter whether the potential value of the second control signal provided by the second control signal line L2 is positive or negative, the potential value provided by the second control signal line L2 needs to be greater than the negative value potential provided by the first negative potential signal line L0.

Optionally, as shown in FIGS. 1 and 2, when the display panel 000 is driven, the boost circuit 20 works, and the first control signal line L1 provides the first control signal, under the control of the first control signal value, the first end 201B of the charging module 201 is electrically connected to the second end 201C of the charging module 201, and the first end 203B and the second end 203C of the initializing module 203 are electrically connected, the first control signal value is respectively transmitted to the gate line G, the control end 202A of the first module 202 and the first electrode C11 of the first capacitor C1, and the potential value provided by the first negative potential signal line L0 is transmitted to the second electrode C12 of the first capacitor C1. Under the control of the first control signal value, the first end 202B and the second end 202C of the first module 202 are electrically connected. The second control signal line L2 provides the second control signal value transmitted to the second electrode C12 of the first capacitor C1. A potential of the second electrode C12 of the first capacitor C1 is increased, and a potential of the first electrode C11 of the first capacitor C1 is coupled by the second electrode C12 of the first capacitor C1 and is increased.

Therefore, when the boost unit 200 of the boost circuit 20 is in a charging state, the potential signal value on the second electrode C12 of the first capacitor C1 is a smaller first negative potential signal value VGL provided by the first negative potential signal line L0, and the potential signal value on the first electrode C11 of the first capacitor C1 is the first control signal value provided by the first control signal line L1. After the first control signal value provided by the first control signal line L1 further controls the conduction between the first end 202B and the second end 202C of the first module 202, the second control signal value provided by the second control signal line L2 can be transmitted to the second electrode C12 of the first capacitor C1 electrically connected to the second end 202C of the first module 202, so that the potential signal value on the second electrode C12 of the first capacitor C1 is a larger second control signal value provided by the second control signal line L2. Since the potential value provided by the second control signal line L2 is greater than the potential value provided by the first negative potential signal line L0, that is, the second control signal value is greater than the first negative potential signal value VGL, and the first capacitor C1 has a bootstrap coupling effect. Therefore, when the potential signal value on the second electrode C12 of the first capacitor C1 increases from the smaller first negative potential signal value VGL to the larger second control signal value, the second electrode C12 of the first capacitor C1 is charged twice. The potential signal value on the first electrode C11 of the first capacitor C1 is also further increased due to the bootstrap effect, so that the potential signal value on the first electrode C11 of the first capacitor C1 is increased from the first control signal value and transmitted to gate line G. Therefore, through an arrangement of the boost circuit 20, a first control signal value of low potential is input to the boost unit 200, a second control signal value of low potential is input to the boost unit 200, and a high potential is output from the boost unit 200 to the gate line G. Even if a demand for writing a high potential to the data line S when the display panel is display is strong, that is, a potential value written on the data line S is very high, the boost circuit 20 can also be configured to ensure that the potential value transmitted from the gate line G to the pixel unit 10 is also relatively high. For example, when the switching transistor in the pixel unit 10 is an N-type switching transistor, a potential provided by the gate line G to the gate of the switching transistor in the pixel unit 10 can also be greater than the potential value written on the data line (e.g., the potential provided by the gate line G to the gate of the switching transistor in the pixel unit 10 is greater than the potential value written on the data line of the source/drain of the switching transistor in the pixel unit 10), ensuring that the switching transistor in the pixel unit 10 is normally turned on and conducted, and a driving signal of the pixel unit 10 is transmitted normally. The embodiment can achieve a low potential input and a high potential output through the arrangement of the boost circuit 20, thereby saving driving power consumption of the display panel, ensuring normal driving of the panel by the driving signal, and ensuring display quality.

Optionally, in one embodiment, the first control signal line L1, the second control signal line L2, the first negative potential signal line L0 and other signal lines electrically connected to the boost circuit 20 can be arranged on the non-display area of the display panel 000, thereby avoiding affecting display quality of display area AA.

It can be understood that figures in the embodiment only illustrate a structure of the display panel 000. During specific implementations, the structure of the display panel 000 includes but is not limited to the structure described above and may also include other structures capable of realizing a display function, which is not detailed herein.

It should be noted that the embodiment does not limit a specific structure of the pixel unit 10. A design structure of the pixel unit 10 can be understood with reference to a structure of a display panel in a related art. The design structure of the pixel unit 10 only needs to satisfy that the pixel unit 10 can be driven to be turned on by a driving potential provided by the gate line G, so that a data potential of the data line S is provided to the pixel unit 10 to achieve image display.

Optionally, in one embodiment, the first control signal line L1, the second control signal line L2, the first negative potential signal line L0 and other signal lines that are electrically connected to the boost circuit 20 can be arranged within the non-display area NA of the display panel 000 to avoid affecting display quality of display area AA.

Figure 3:
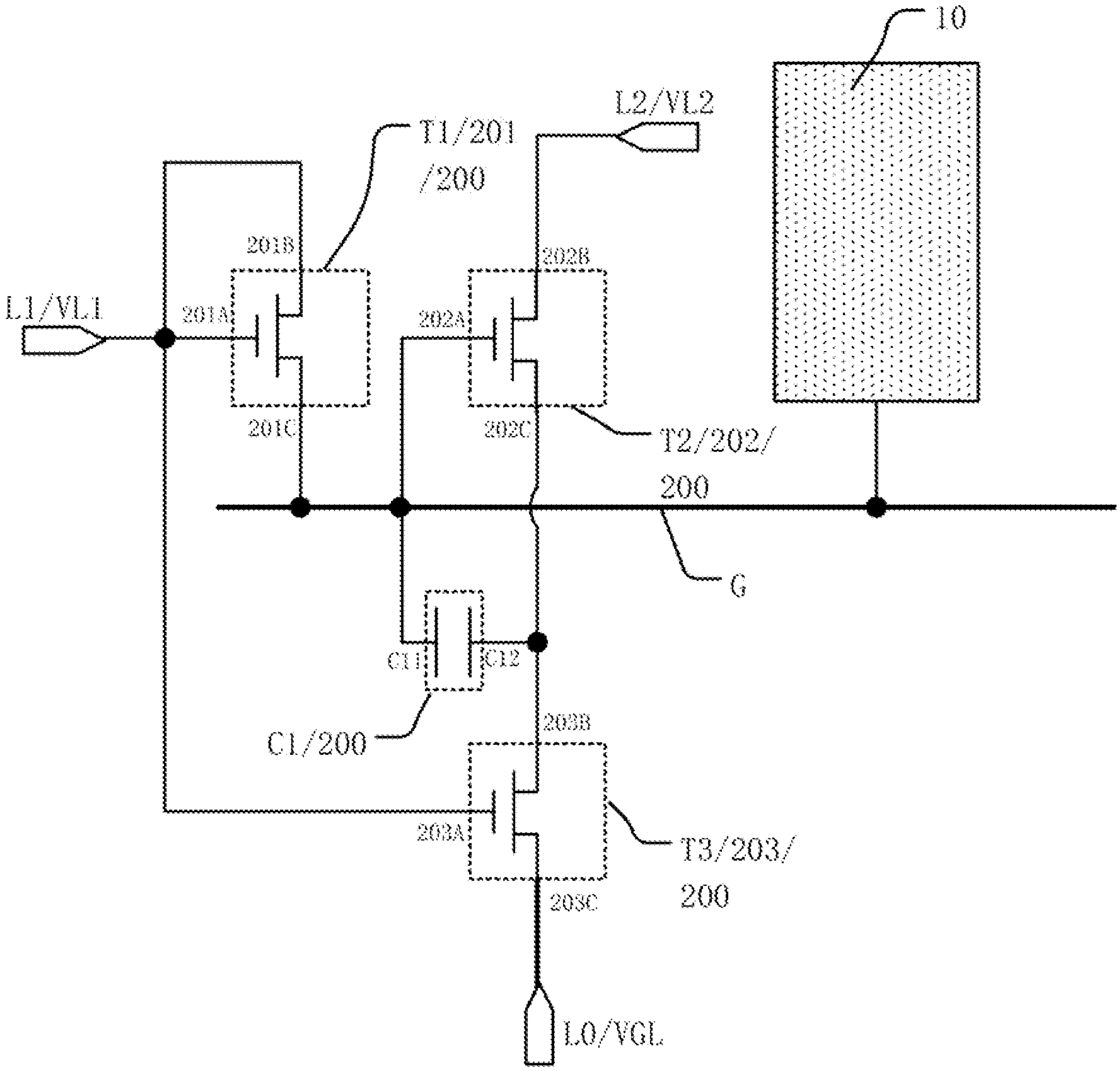
FIG. 3 illustrates an electrical connection diagram in FIG. 2.

FIG. 3 illustrates an electrical connection diagram in FIG. 2. Referring to FIGS. 1-3, in one embodiment, the charging module 201 includes a first transistor T1, the first module 202 includes a second transistor T2, and the initialization module 203 includes a third transistor T3. A gate of the first transistor T1 is electrically connected to the first control signal line L1, a source of the first transistor T1 is electrically connected to the gate of the first transistor T1 and a drain of the first transistor T1 is electrically connected to the gate line G, a gate of the second transistor T2 and the first electrode C11 of the first capacitor C1 respectively. A source of the second transistor T2 is electrically connected to the second control signal line L2, and a drain of the second transistor T2 is electrically connected to the second electrode C12 of the first capacitor C1. A gate of the third transistor T3 is electrically connected to the first control signal line L1, a source of the third transistor T3 is electrically connected to the drain of the second transistor T2, and a drain of the third transistor T3 is electrically connected to the first negative potential signal line L0.

Figure 4:
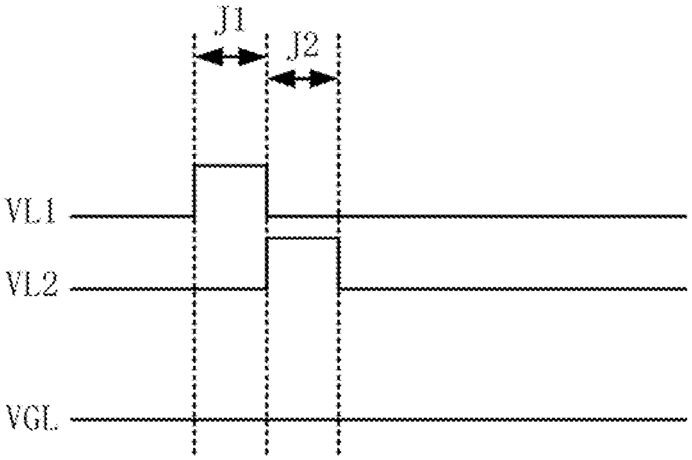
FIG. 4 illustrates a timing diagram of an input signal when a circuit structure in FIG. 3 works.

The embodiment explains that the boost circuit 20 is arranged in the non-display area NA of the display panel 000 to input a first control signal value of low potential and a second control signal value of low potential to each boost unit 200 of the boost circuit 20 and output a high potential from each boost unit 200 of the boost circuit 20 to the gate line G to save driving power consumption of the panel. A circuit structure of each boost unit 200 of the boost circuit 20 may include a plurality of transistors. Specifically, the charging module 201 includes a first transistor T1, the first module 202 includes a second transistor T2, and the initialization module 203 includes a third transistor T3. Optionally, in one embodiment, the first transistor T1, the second transistor T2, and the third transistor T3 are all N-type transistors, a gate of a N-type transistor is controlled by a high potential, and a source and a drain of the N-type transistor are electrically connected, optionally, in some optional embodiments, the first transistor T1, the second transistor T2, and the third transistor T3 may all be P-type transistors, a gate of a P-type transistor is controlled by a low potential, and a source and a drain of the N-type transistor are electrically connected, which is not limited herein. The gate of the third transistor T3 of the initialization module 203 (e.g., the control end 203A of the initialization module 203) is electrically connected to the first control signal line L1. The source of the third transistor T3 (e.g., the first end 203B of the initialization module 203) is electrically connected to the second electrode C12 of the first capacitor C1. The drain of the third transistor T3 (e.g., the second end 203C of the initialization module 203) is electrically connected to the first negative potential signal line L0. The gate of the first transistor T1 of the charging module 201 (e.g., the control end 201A of the charging module 201) is electrically connected to the first control signal line L1. The source of the first transistor T1 (e.g., the first end 201B of the charging module 201) is electrically connected to the gate of the first transistor T1. The drain of the first transistor T1 (e.g., the second ends 201C of the charging module 201) is connected to the gate line G, the gate of the second transistor T2 (e.g., the control end 202A of the first module 202), and the first electrode C11 of the first capacitor C1 respectively. The source of the second transistor T2 of the first module 202 (e.g., the first end 202B of the first module 202) is electrically connected to the second control signal line L2. The drain of the second transistor T2 (e.g., the second end 202C of the first module 202) is electrically connected to the second electrode C12 of the first capacitor C1. FIG. 4 illustrates a timing diagram of the input signal when a circuit structure in FIG. 3 works. As shown in FIG. 3 and FIG. 4, the first transistor T1, the second transistor T2, and the third transistor T3 are taken as N-type transistors as an example for illustration. A working process of each boost unit 200 of the boost circuit 20 can be as follows.

In a charging stage J1, a first control signal value VL1 provided by the first control signal line L1 is high, and a second control signal value VL2 provided by the second control signal line L2 is low. The first transistor T1 and the third transistor T3 are turned on under a control of the first control signal with high potential VL1, and the first control signal value VL1 of high potential is gradually transmitted to the gate line G. A signal value on the gate line G gradually increases to the first control signal value VL1 of high potential, and a signal value on the first electrode C11 of the first capacitor C1 also gradually increases to the first control signal value VL1 of high potential. The first negative-potential signal value VGL of low potential provided by the first negative-potential signal line L0 is transmitted to the second electrode C12 of the first capacitor C1. The signal value on the second electrode C12 of the first capacitor C1 is the first negative potential signal value VGL of low potential. The first control signal value VL1 of high potential is transmitted to the gate of the second transistor T2 through the first transistor T1, so that a gate potential of the second transistor T2 gradually increases, and the second transistor T2 gradually to be turned on.

In a bootstrap stage J2, the first control signal value VL1 provided by the first control signal line L1 is low, and the second control signal value VL2 provided by the second control signal line L2 is high. The first transistor T1 and the third transistor T3 are turned off under a control of the first control signal value VL1 of low potential, and the gate of the second transistor T2 is provided with a high-potential signal in the charging stage J1. Therefore, the second transistor T2 remains to be turned on, and the second control signal value VL2 of high potential is transmitted to the second electrode C12 of the first capacitor C1 through the second transistor T2. The potential on the second electrode C12 of the first capacitor C1 increases from the first negative potential signal value VGL of low potential to the second control signal value VL2 of high potential. The signal value on the first electrode C11 of the first capacitor C1 is coupled and increased to a higher potential. The first electrode C11 of the first capacitor C1 is electrically connected to the gate line G. Therefore, the potential transmitted on the gate line G is also increased to a higher potential, so that the first control signal value VL1 of low potential can be input to each boost unit 200 of the boost circuit 20. The second control signal value VL2 of low potential is input to each boost unit 200 of the boost circuit 20, and the high potential is output from each boost unit 200 of the boost circuit 20 to the gate line G, thereby saving a driving power consumption of the display panel. Even if the potential written on the data line S is very high when the display panel is displayed, the boost circuit 20 can ensure that the potential transmitted from the gate line G to the pixel unit 10 is also relatively high. For example, when the switching transistor in the pixel unit 10 is also an N-type switching transistor, the potential provided by the gate line G to the gate of the switching transistor in the pixel unit 10 can also reach a level sufficiently high to exceed the potential written on the data line, thereby ensuring that the switching transistor in the pixel unit 10 can be turned on normally and the driving signal of the pixel unit 10 can be transmitted normally, and ensuring normal driving of the display panel by a driving signal and display quality during display.

Figure 5:
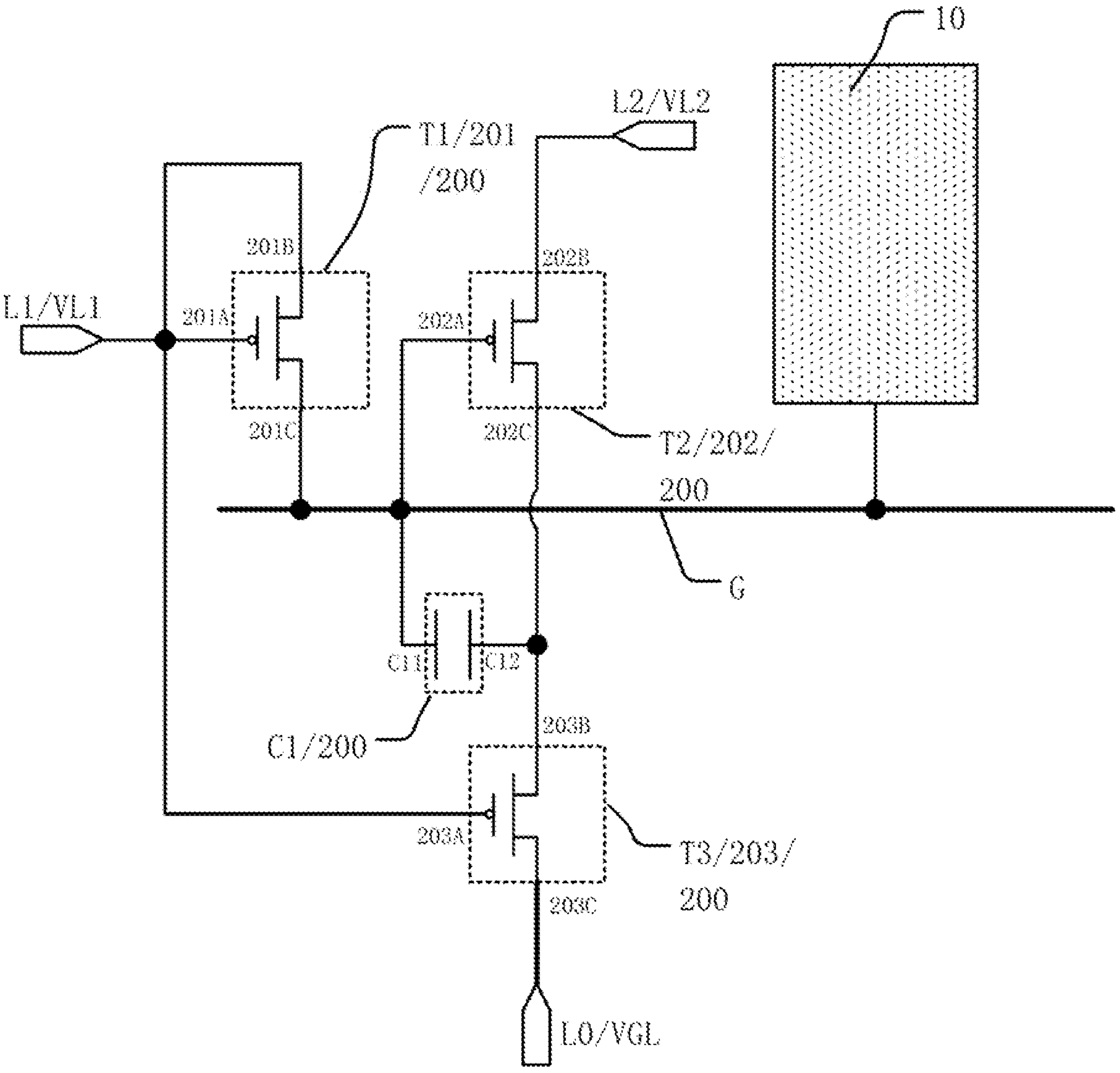
FIG. 5 illustrates another electrical connection diagram in FIG. 2.
Figure 6:
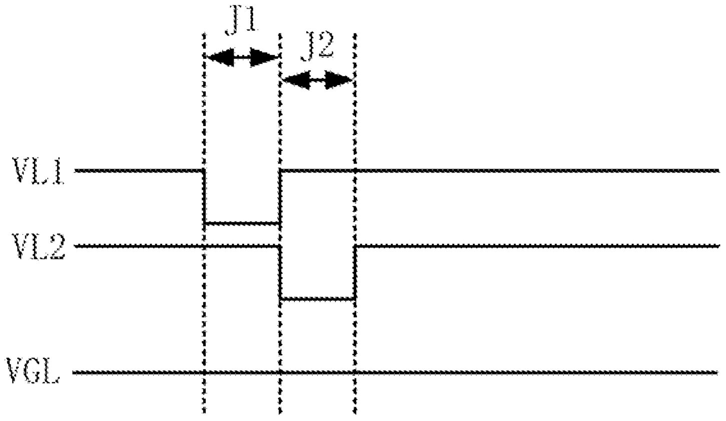
FIG. 6 illustrates a timing diagram of an input signal when a circuit structure in FIG. 5 works.

It can be understood that FIG. 3 and FIG. 4 in the embodiment are illustrated by taking an example that the first transistor T1, the second transistor T2, and the third transistor T3 are all N-type transistors, and the switching transistor included in the pixel unit 10 is an N-type transistor. Gates of the first transistor T1, the second transistor T2, and the third transistor T3 are turned on under the high potential VL1 of the first control signal. The second control signal value VL2 of high potential is greater than the first negative potential signal value VGL of low potential, which can realize a bootstrap effect, so that the potential provided by the gate line G in the pixel unit 10 to the gate of the switching transistor in the pixel unit 10 is greater than the potential written on the data line of the source/drain of the switching transistor in the pixel unit 10 to satisfy a high potential on the data line to be normally written on the pixel unit 10. FIG. 5 illustrates another electrical connection diagram in FIG. 2. FIG. 6 illustrates a timing diagram of an input signal when a circuit structure in FIG. 5 works. The first transistor T1, the second transistor T2, and the third transistor T3 are all P-type transistors, and the switching transistor in the pixel unit 10 is a P-type transistor. The gates of the first transistor T1, the second transistor T2, and the third transistor T3 are turned on under the first control signal value VL1 of low potential. Although the second control signal value VL2 is low, the second control signal value VL2 of low potential needs to be greater than the first negative potential signal VGL of low potential to realize a bootstrap effect, so that the potential provided by the gate line G in the pixel unit 10 to the gate of the switching transistor in the pixel unit 10 is greater than the potential written on the data line of the source/drain of the switching transistor in the pixel unit 10, which satisfies a high potential on the data line to be normally written into the pixel unit 10.

It can be understood that terms "low potential" and "low level" in the above embodiments can be understood to indicate that the potential of a signal is negative, and the terms "high potential" and "high level" can be understood to indicate that the potential of the signal is positive, which are not repeated and explained in subsequent embodiments.

Figure 7:
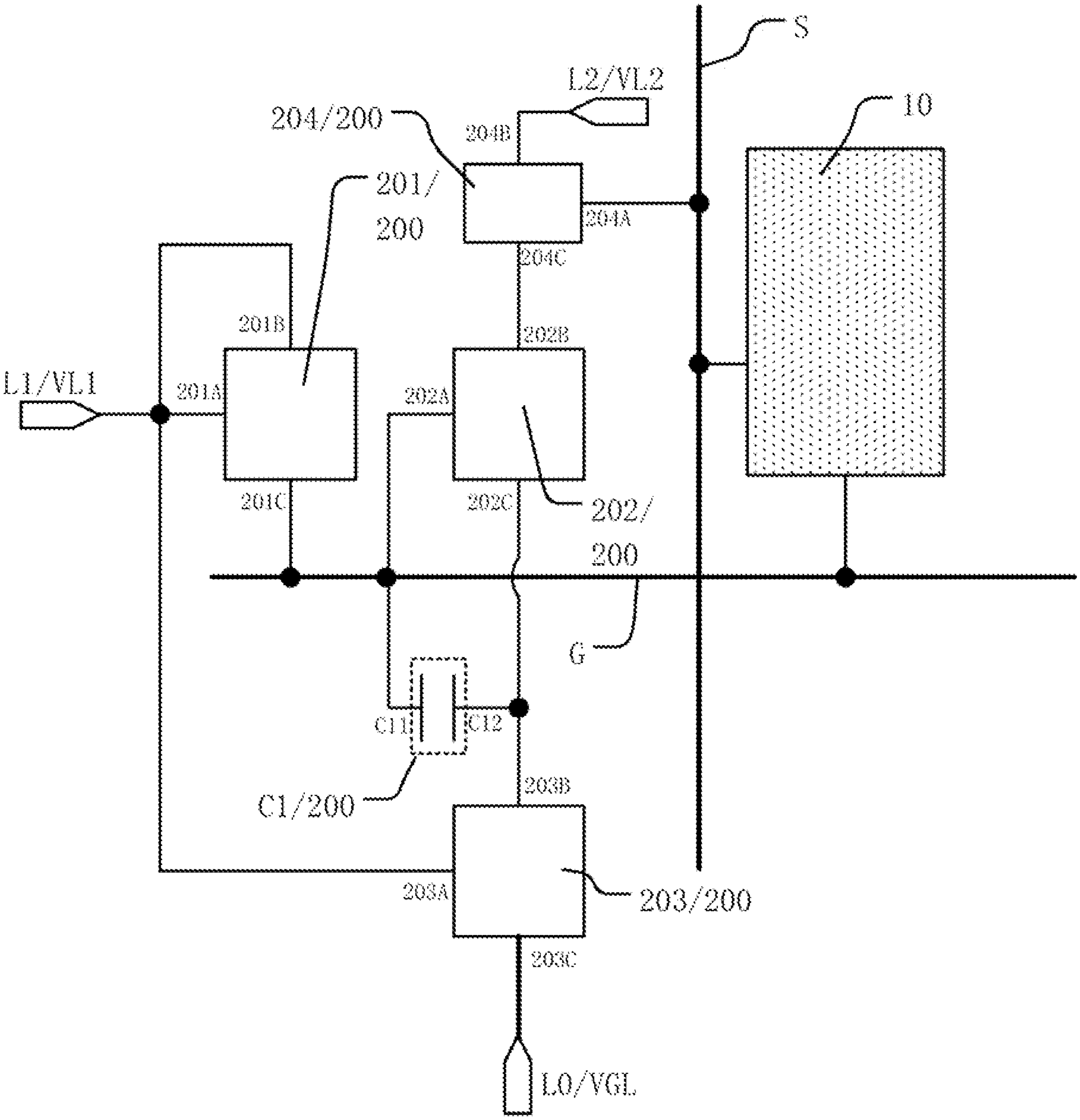
FIG. 7 illustrates another electrical connection diagram between boost units and pixel units in FIG. 1.

FIG. 7 illustrates another electrical connection diagram between boost units and pixel units in FIG. 1. Referring to FIG. 1 and FIG. 7, optionally, in one embodiment, the display panel 000 also includes a plurality of data lines S. The boost unit 200 also includes a strobe module 204. A control end 204A of strobe module 204 is electrically connected to the data line S. A first end 204B of the strobe module 204 is electrically connected to the second control signal line L2. A second end 204C is electrically connected to the first end 202B of the first module 202.

The embodiment explains that in the boost circuit 20 provided in the non-display area NA of the display panel 000, each boost unit 200 also includes a strobe module 204. Whether the first end 204B and the second end 204C of the strobe module 204 are turned on or not can be controlled by the potential signal provided on the data line S in the display panel 000. Specifically, the control end 204A of the strobe module 204 is electrically connected to the data line S, and the first end 204B of the strobe module 204 is electrically connected to the second control signal line L2. The second end 204C of the strobe module 204 is electrically connected to the first end 202B of the first module 202. The potential signal provided on the data line S controls whether the second control signal value VL2 provided by the second control signal line L2 is transmitted to the first end 202B of the first module 202. When the display panel 000 drives display, the potential signal transmitted on the data line S includes a positive potential signal and a negative potential signal. When the potential signal transmitted on the data line S is a positive potential signal, the potential transmitted on the gate line G (e.g., the gate on-state potential of the switching transistor in the pixel unit 10) must be higher than the positive potential transmitted on the data line S (e.g., the potential of the source/drain of the switching transistor in the pixel unit 10) to write a data potential signal to the pixel unit 10. For example, when the pixel unit 10 includes a switching transistor and a pixel electrode, the gate of the switching transistor is connected to the gate line G, the source of the switching transistor is connected to the data line S, and the drain of the switching transistor is connected to a pixel electrode. The potential transmitted on the gate line G must be higher than the positive potential transmitted on the data line S, so that the switching transistor in the pixel unit 10 can charge the pixel electrode in the pixel unit 10. When the potential signal transmitted on the data line S is a negative potential signal, indicating a relatively low source/drain potential of the switching transistor in the pixel unit 10, the potential transmitted on the gate line G of the switching transistor does not need to be as high as when the potential signal transmitted on the data line S is a positive potential signal as long as the gate on-state potential of the switching transistor in the pixel unit 10, that is, the potential transmitted on the gate line G must be greater than the negative potential signal value transmitted on the data line S to enable a charging of the pixel electrode in the pixel unit 10 by the switching transistor in the pixel unit 10. For example, the potential on data line S is +5V, and the potential on the gate line G needs to be 25V, a 20V difference between the two potentials ensures that the switching transistor in the pixel unit 10 is turned on to realize a charging of the pixel electrode in the pixel unit 10 by the switching transistor in the pixel unit 10. If the potential on the data line S is −5V, and a difference between the potential on the data line S and the potential on the gate line G is 20V, the switching transistor in the pixel unit 10 can be turned on. Therefore, the potential transmitted on the gate line G only needs to be 15V without increasing the potential of the gate line G through the bootstrap effect of the first capacitor C1. In the embodiment, the control end 204A of the strobe module 204 is electrically connected to the data line S. The first end 204B of the strobe module 204 is electrically connected to the second control signal line L2, and the second end 204C of the strobe module 204 is electrically connected to the first end 202B of the first module 202. The potential transmitted on the data line S controls whether the second control signal provided by the second control signal line L2 is transmitted to the first end 202B of the first module 202. When a negative potential is transmitted on the data line S, the first end 204B, the second end 204C of the strobe module 204 can be disconnected. That is, the boost unit 200 does not need to increase the potential of the gate line G through the bootstrap effect of the first capacitor C1, so that the switching transistor in the pixel unit 10 can be turned on normally, and the driving signal of the pixel unit 10 can be transmitted normally, thereby further saving the driving power consumption of the display panel.

Figure 8:
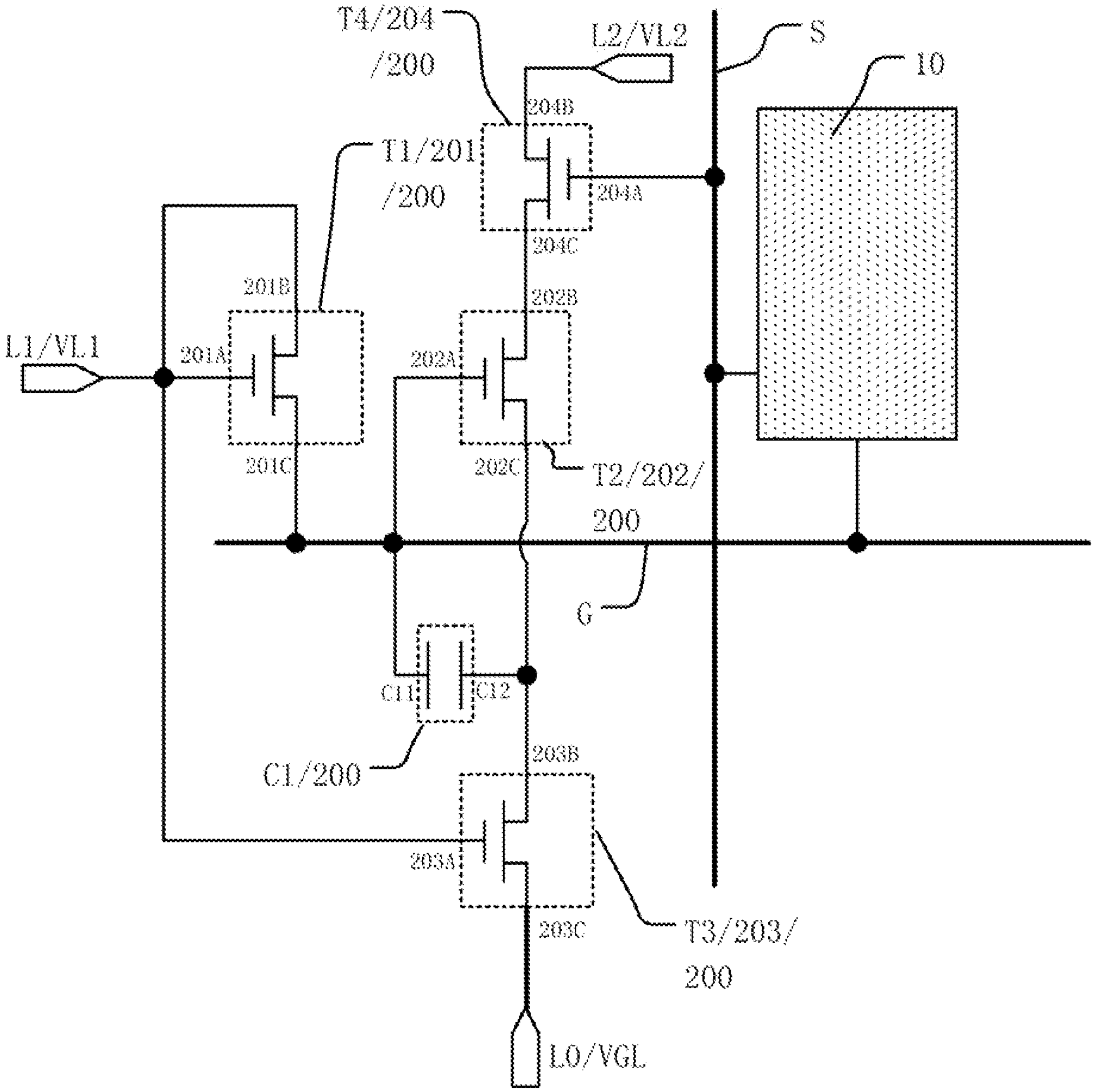
FIG. 8 illustrates an electrical connection diagram in FIG. 7.

FIG. 8 illustrates an electrical connection diagram in FIG. 7. Referring to FIG. 7 and FIG. 8, optionally, in one embodiment, the strobe module 204 includes a fourth transistor T4. A gate of the fourth transistor T4 is electrically connected to the data line S, a source of the fourth transistor T4 is electrically connected to the second control signal line L2, and a drain of the fourth transistor T4 is electrically connected to the first end 202B of the first module 202.

The embodiment explains that the boost circuit 20 is arranged in the non-display area NA of the display panel 000 to input both the first control signal value of low potential and the second control signal of low potential to each boost unit 200 of the boost circuit 20, a high potential output from each boost unit 200 of the boost circuit 20 to the gate line G to save the driving power consumption of the panel. A circuit structure of each boost unit 200 of the boost circuit 20 may include a plurality of transistors. Specifically, the charging module 201 includes a first transistor T1, the first module 202 includes a second transistor T2, the initialization module 203 includes a third transistor T3, and the strobe module 204 includes a fourth transistor T4. Optionally, in the embodiment, the first transistor T1, the second transistor T2, the third transistor T3, and the fourth transistor are all N-type transistors. A gate of the N-type transistor is controlled by a high potential, and a source and drain thereof are conductive. In some other optional embodiments, the first transistor T1, the second transistor T2, the third transistor T3, and the fourth transistor may all be P-type transistors. A gate of the P-type transistor is controlled by a low potential, and a source and drain thereof are conductive. The gate of the fourth transistor T4 of the strobe module 204 (e.g., the control end 204A of the strobe module 204) is electrically connected to the data line S. The source of the fourth transistor T4 (e.g., the first end 204B of the strobe module 204) is electrically connected to the second control signal line L2. The drain of the fourth transistor T4 (e.g., the second end 204C of the strobe module 204) is electrically connected to the first end 202B of the first module 202. As shown in FIG. 4 and FIG. 8 (the timing diagram of the input signal when the circuit structure shown in FIG. 8 works can be referred to FIG. 4), taking the first transistor T1, the second transistor T2, the third transistor T3, and the fourth transistor as N-type transistors as an example, a working process of each boost unit 200 of the boost circuit 20 can be as follows.

In the charging stage J1, the first control signal value VL1 provided by the first control signal line L1 is high (e.g., +5V) and the second control signal value VL2 provided by the second control signal line L2 is low. The first transistor T1 and the third transistor T3 are turned on under the control of the high potential (e.g., +5V) of the first control signal VL1. The first control signal value VL1 of high potential (e.g., +5V) is gradually transmitted to the gate line G. The potential on the gate line G gradually increases to the first control signal value VL1 and the potential on the first electrode C11 of the first capacitor C1 also gradually increases to first control signal value VL1 of high potential (e.g., +5V). The first negative potential signal value VGL of low potential (e.g., −25V) provided by the first negative potential signal line L0 is transmitted to the second electrode C12 of the first capacitor C1. The potential on the second electrode C12 of the first capacitor C1 is the low potential VGL of the first negative potential signal. The first control signal value VL1 of high potential is transmitted to the gate of the second transistor T2 through the first transistor T1, so that the gate potential of the second transistor T2 gradually increases, and the second transistor T2 gradually to be turned on.

In the bootstrap stage J2, if the potential signal transmitted on the data line S is a negative potential signal (e.g., −15V), the fourth transistor T4 is turned off. The first control signal value VL1 provided by the first control signal line L1 is low, and the second control signal value VL2 provided by the second control signal line L2 is high. The first transistor T1 and the third transistor T3 are turned off under the control of the first control signal value VL1 of low-level. The gate of the second transistor T2 has already been provided with a high potential signal (e.g., +5V) in the charging stage J1, the second transistor T2 remains to be turned on. Since the fourth transistor T4 is turned off, the second control signal value VL2 of high potential cannot be transmitted to the second electrode C12 of the first capacitor C1 through the second transistor T2, the potential of the second electrode C12 of the first capacitor C1 remains to be the first negative potential signal value VGL of low potential (e.g., −25V) provided by the first negative potential signal line L0 in the charging stage J1. The signal value on the first electrode C11 of the first capacitor C1 is the first control signal value VL1 of high potential (e.g., +5V) provided by the first control signal line L1, that is, the first capacitor C1 does not need to be bootstrapped and the potential of the first electrode C11 of the first capacitor C1 does not need to be increased through coupling. The gate line G transmits the first control signal value VL1 of high potential (e.g., +5V) provided by the first control signal line L1 in the charging stage J1. Since the first control signal value VL1 of high potential (e.g., +5V) must be greater than the negative potential signal (e.g., −15V) transmitted on the data line S, there is no need to increase the potential of the gate line G to ensure that the switching transistor in the pixel unit 10 can be turned on normally.

If the potential signal transmitted on the data line S is a positive potential signal (e.g., +15V), the fourth transistor T4 is turned on. The first control signal value VL1 provided by the first control signal line L1 is low, and the second control signal value VL2 provided by the second control signal line L2 is high (e.g., +5V). The first transistor T1 and the third transistor T3 are turned off under the control of the first control signal value VL1 of low potential, and the gate of the second transistor T2 is provided with the high-potential signal (e.g., +5V) in the charging stage J1. Therefore, the second transistor T2 remains to be turned on. Since the fourth transistor T4 is turned on, the second control signal value VL2 of high potential (e.g., +5V) is transmitted to the second electrode C12 of the first capacitor C1 through the second transistor T2, the potential on the second electrode C12 of the first capacitor C1 increases from the first negative potential signal value VGL of low potential (e.g., −25V) to the second control signal value VL2 of high potential (e.g., +5V). The potential on the first electrode C11 of the first capacitor C1 is coupled to a higher potential (e.g., the +5V of the charging stage J1 is coupled to +35V). The first electrode C11 of the first capacitor C1 is electrically connected to the gate line G, so the potential transmitted on the gate line G is also increased to a higher potential (e.g., +35V). The potential transmitted on the gate line G that is increased to a higher potential value (e.g., s +35V) is greater than the positive potential signal transmitted on the data line S (e.g., +15V). Therefore, increasing the potential on the gate line G in the bootstrap stage J2 can ensure that the switching transistor in the pixel unit 10 can be turned on normally.

In the embodiment, arranging the fourth transistor T4 of the strobe module 204 can realize inputting the first control signal value VL1 of low potential to each boost unit 200 of the boost circuit 20. The second control signal value VL2 of low potential is input to each boost unit 200 of the boost circuit 20, and the high potential is output from each boost unit 200 of the boost circuit 20 to the gate line G, thereby saving the driving power consumption of the panel. Even if the positive potential value written on the data line S is relatively high when the display panel is displayed, the boost circuit 20 can ensure that the potential value transmitted from the gate line G to the pixel unit 10 is also relatively high. For example, when the switching transistor in the pixel unit 10 is an N-type switching transistor, the potential provided by the gate line G to the gate of the switching transistor in the pixel unit 10 can be higher than the potential written on the data line, ensuring that the switching transistor in the pixel unit 10 can be turned on normally and the driving signal of the pixel unit 10 can be transmitted normally. Through an arrangement of the bootstrap module in the boost unit 200, the gate line G can realize a low potential input and a high potential output, which is conducive to saving the driving power consumption of the display panel, ensuring a normal driving of the display panel by the driving signal, and ensure display quality during display. Through the fourth transistor T4 included in the strobe module 204, the negative potential transmitted on the data line S controls the second control signal provided by the second control signal line L2 is not transmitted to the first end 202B of the first module 202. That is, when the data line S transmits a negative potential, the boost unit 200 does not need to increase the potential of the gate line G through the bootstrap effect of the first capacitor C1. The unincreased potential on the gate line G is sufficient for the switching transistor in the pixel unit 10 to be turned on normally and the driving signal of the pixel unit 10 can be transmitted normally. The switching transistor in the pixel unit 10 does not need to be turned on by a high potential driving, which can reduce a life loss of the switching transistor in the pixel unit 10 and improve a service life and a durability of the switching transistor.

It can be understood that, in the embodiment shown in FIG. 8, the first transistor T1, the second transistor T2, the third transistor T3, and the fourth transistor T4 are all N-type transistors, and the switching transistor included in the pixel unit 10 is an N-type transistor. The gates of the first transistor T1, the second transistor T2, and the third transistor T3 are turned on under the first control signal value VL1 of high potential, and the gate of the fourth transistor T4 is turned on under the potential signal provided by the data line S of positive potential. The second control signal value VL2 of high potential is greater than the first negative potential signal value VGL of low potential, which can achieve a bootstrap effect, so that the potential provided by the gate line G in the pixel unit 10 to the gate of the switching transistor in the pixel unit 10 is greater than the potential value written on the data line of the source/drain of the switching transistor in the pixel unit 10, which satisfies a normal writing of high potential on the data line to the pixel unit 10. When the first transistor T1, the second transistor T2, the third transistor T3, and the fourth transistor T4 are all P-type transistors, and the switching transistor included in the pixel unit 10 is a P-type transistor, the gates of the first transistor T1, the second transistor T2, and the third transistor T3 are turned on under the first control signal value VL1 of low potential, and the gate of the fourth transistor T4 is turned on by the negative potential signal provided by the data line S. Although the second control signal value VL2 is low, the second control signal value VL2 of low potential needs to be greater than the first negative potential signal value VGL of low potential to realize a bootstrap effect, so that the potential provided by the gate line G in the pixel unit 10 to the gate of the switching transistor in the pixel unit 10 is greater than the potential value written on the data line of the source/drain of the switching transistor in the pixel unit 10, which satisfies a normal writing of high potential on the data line to the pixel unit 10.

Optionally, in one embodiment, the fourth transistor T4 included in the strobe module 204 determines whether the gate potential of the switching transistor of the pixel unit 10 is bootstrapped through the potential signal provided by the data line S. Taking the first transistor T1, the second transistor T2, the third transistor T3, and the fourth transistor T4 and the switching transistor included in the pixel unit 10 as N-type transistors as an example, bootstrapping through the boost unit 200 can be alleviate a potential drop when the N-type transistor transmits a high potential. When N-type transistors including the first transistor T1, second transistor T2, third transistor T3, fourth transistor T4, and the switching transistor in the pixel unit 10, transmit a negative potential, bootstrapping is unnecessary as there is no potential drop. For an N-type transistor, the gate is turned on when the N-type transistor is at a high potential, and there is no signal loss when a low potential (i.e., the negative potential on the data line S) is transmitted between the source and the drain, resulting in an absence of a potential drop. That is, the gate potential of the switching transistor in the pixel unit 10 does not require an increase through bootstrapping, which effectively prevents a potential drop. The gate of the N-type transistor is turned on when the N-type transistor is at a high potential. If a high potential is transmitted between the source and drain (i.e., the signal potential on the data line S is positive), the transmitted high potential drops. Therefore, in the embodiment, after the positive potential signal on the data line S controls the fourth transistor T4 of the strobe module 204 to be turned on, bootstrapping the boost unit 200 to ensure that the gate potential of the switching transistor of the pixel unit 10 is greater than the positive potential signal transmitted on the data line S, can avoid both a charging potential drop and a potential drop of the positive potential signal transmitted on the data line S, thereby ensuring normal operation of the pixel unit 10 and further improving display quality.

Optionally, as shown in FIGS. 1, 4, 7 and 8, in one embodiment, the potential value transmitted on the data line S includes a first data potential value Vdata1 and a second data potential value Vdata2. The first data potential value Vdata1 is negative, and the first data potential value Vdata1 is less than a potential value provided by the second control signal line L2 (e.g., the second control signal value VL2 in the bootstrap stage J2). The second data potential value Vdata2 is positive, and the second data potential value Vdata2 is greater than the potential value provided by the second control signal line L2 (i.e., the second control signal value VL2 in the bootstrap stage J2).

Figure 9:
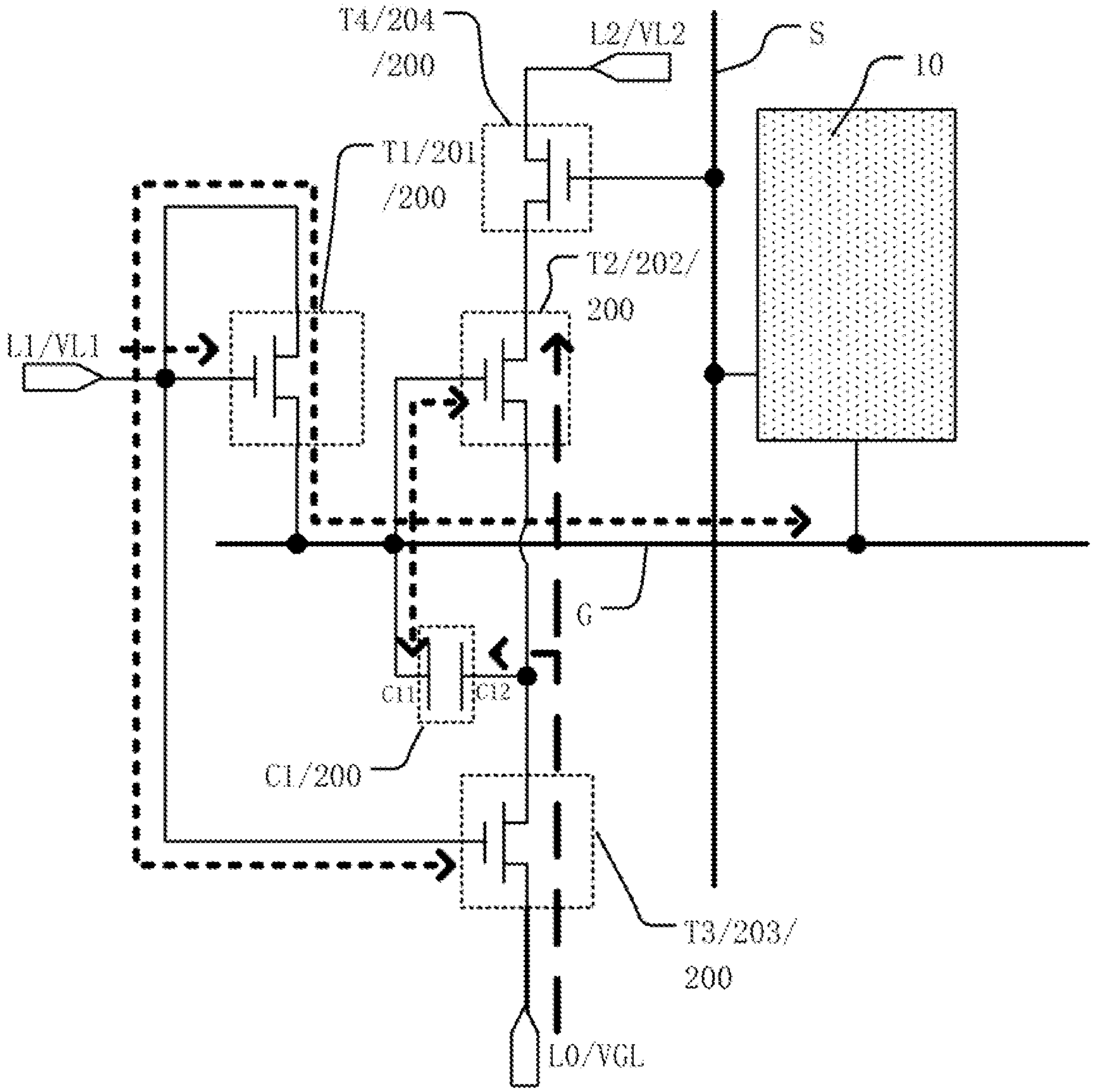
FIG. 9 illustrates a signal transmission diagram of a circuit structure in FIG. 8.
Figure 10:
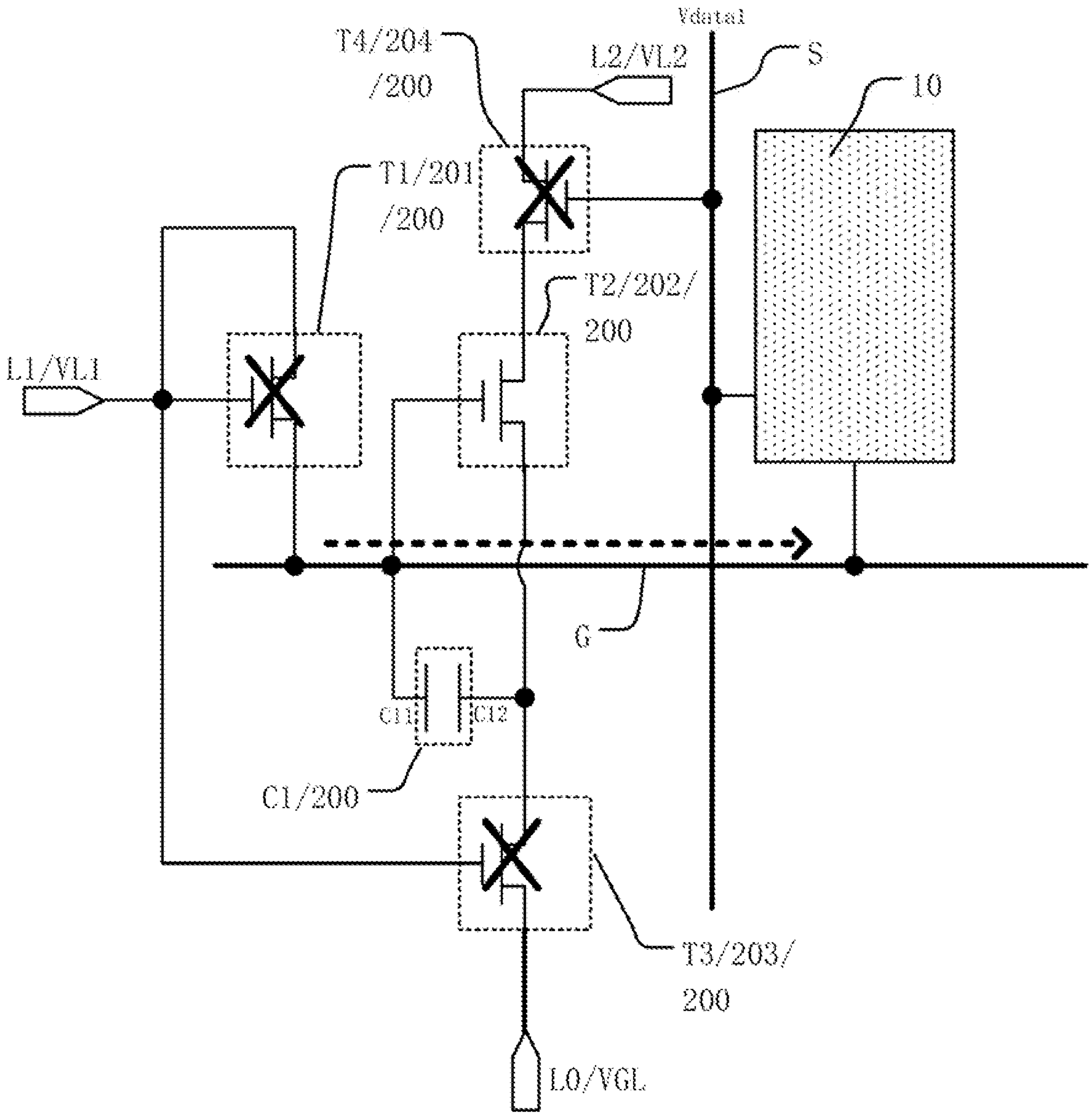
FIG. 10 illustrates another signal transmission diagram of a circuit structure in FIG. 8.
Figure 11:
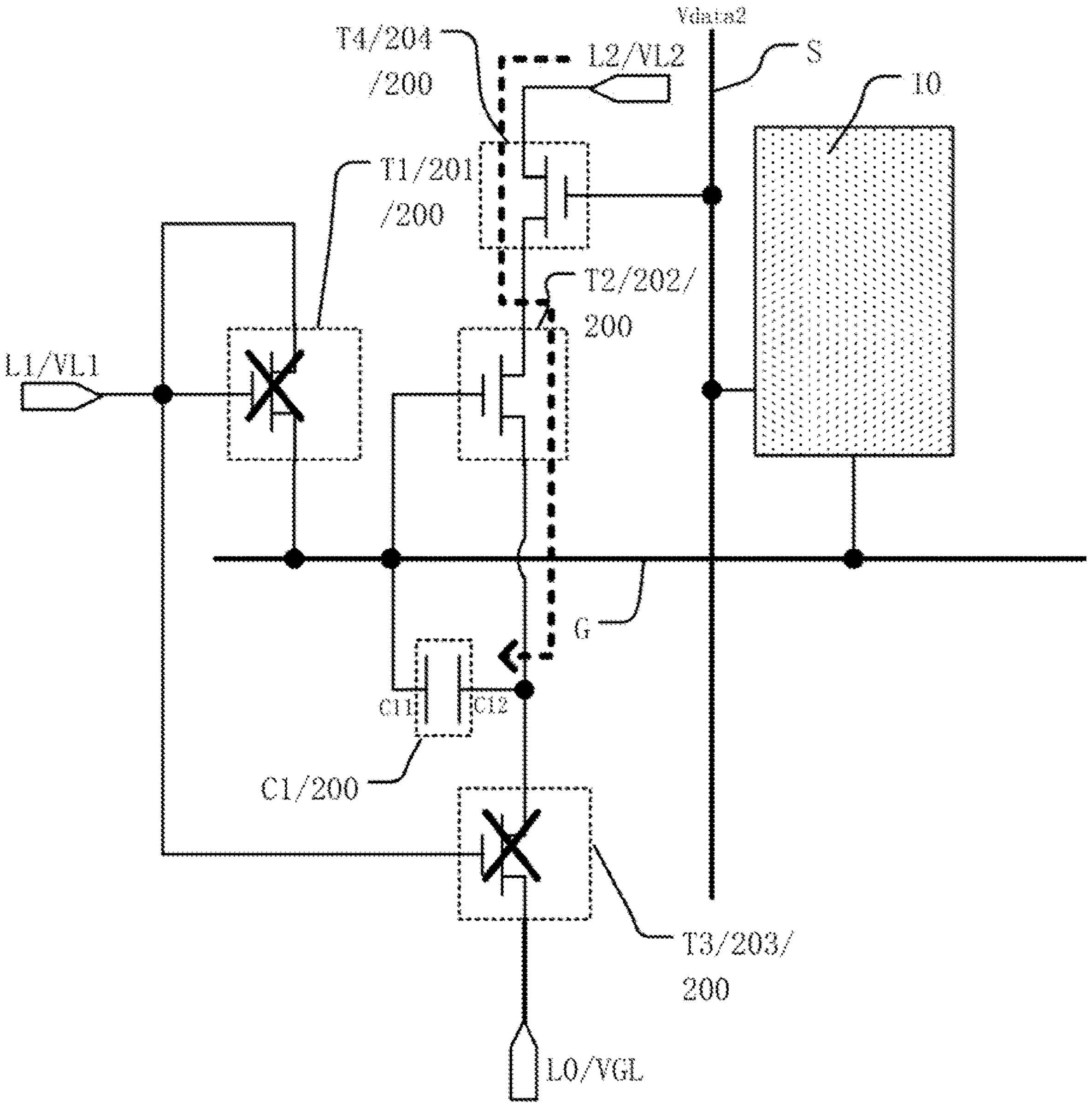
FIG. 11 illustrates another signal transmission diagram of a circuit structure in FIG. 8.

The embodiment explains that when the display panel 000 drives display, the potential signals transmitted on the data line S includes a positive potential signal and a negative potential signal. That is, the potential values transmitted on the data line S include a negative first data potential value Vdata1 and a positive second data potential value Vdata2. FIG. 9 illustrates a signal transmission diagram of a circuit structure in FIG. 8, FIG. 10 illustrates another signal transmission diagram of a circuit structure in FIG. 8, and FIG. 11 illustrates another signal transmission diagram of a circuit structure in FIG. 8 (x in FIGS. 9-11 indicates that the transistor is turned off, no mark indicates that the transistor is turned on, and a dotted line with an arrow indicates a signal transmission path). FIG. 9 illustrates the signal transmission situation of the circuit structure in FIG. 8 in the charging stage J1. FIG. 10 illustrates the signal transmission of the circuit structure in FIG. 8 in the bootstrap stage J2 when the potential value transmitted on the data line S is negative. FIG. 10 also illustrates the signal transmission of the circuit structure in FIG. 8 in the bootstrap stage J2 when the potential value transmitted on the data line S is positive. The potential value transmitted on the data line S in FIG. 9 is a negative first data potential value Vdata1 smaller than the potential value provided by the second control signal line L2 (e.g., the potential value of the second control signal value VL2 in the bootstrap stage J2). That is, the gate potential of the fourth transistor T4 (first data potential value Vdata1) can be maintained smaller than the source potential of the fourth transistor T4 (second control signal value VL2), so that the fourth transistor T4 is in a turning-off state in the bootstrap stage, the first capacitor C1 does not require bootstrapping, secondary charging, or an increase in the potential of the first electrode C11 of the first capacitor C1 through coupling. The signal value transmitted on the gate line G remains to be the first control signal value VL1 of high potential provided by the first control signal line L1 in the charging stage J1. Since the first control signal value VL1 of high potential must be greater than the negative potential signal transmitted on the data line S, there is no need to increase the potential of the gate line G to ensure that the switching transistor in the pixel unit 10 can be turned on normally, thereby saving driving power consumption.

The potential value transmitted on the data line S in FIG. 10 is the second data potential value Vdata2 with a positive value, and the second data potential value Vdata2 is greater than the potential value provided by the second control signal line L2 (e.g., the second control signal value VL2 in the bootstrap stage J2). That is, for the N-type fourth transistor T4, the gate potential of the fourth transistor T4 (the second data potential value Vdata2) can be maintained greater than the source potential of the fourth transistor T4 (the second control signal value VL2), so that the fourth transistor T4 is turned on in the bootstrap stage. The second control signal value VL2 of high potential is transmitted to the second electrode C12 of the first capacitor C1 through the second transistor T2. The potential of the second electrode C12 of the first capacitor C1 increases from the low potential first negative potential signal value VGL to the high potential second control signal value VL2. The potential of the first electrode C11 of the first capacitor C1 is increased to a higher potential by coupling for secondary charging. The first electrode C11 of the first capacitor C1 is electrically connected to the gate line G, so the potential transmitted on the gate line G is also increased to a higher potential value greater than the positive second data potential value Vdata2 transmitted on the data line S. Therefore, increasing the potential of the gate line G through the bootstrap stage J2 can ensure that the switching transistor in the pixel unit 10 can be normally turned on and conduct, realizing a low potential input and a high potential output, which is conducive to saving power consumption and ensuring display quality.

Figure 12:
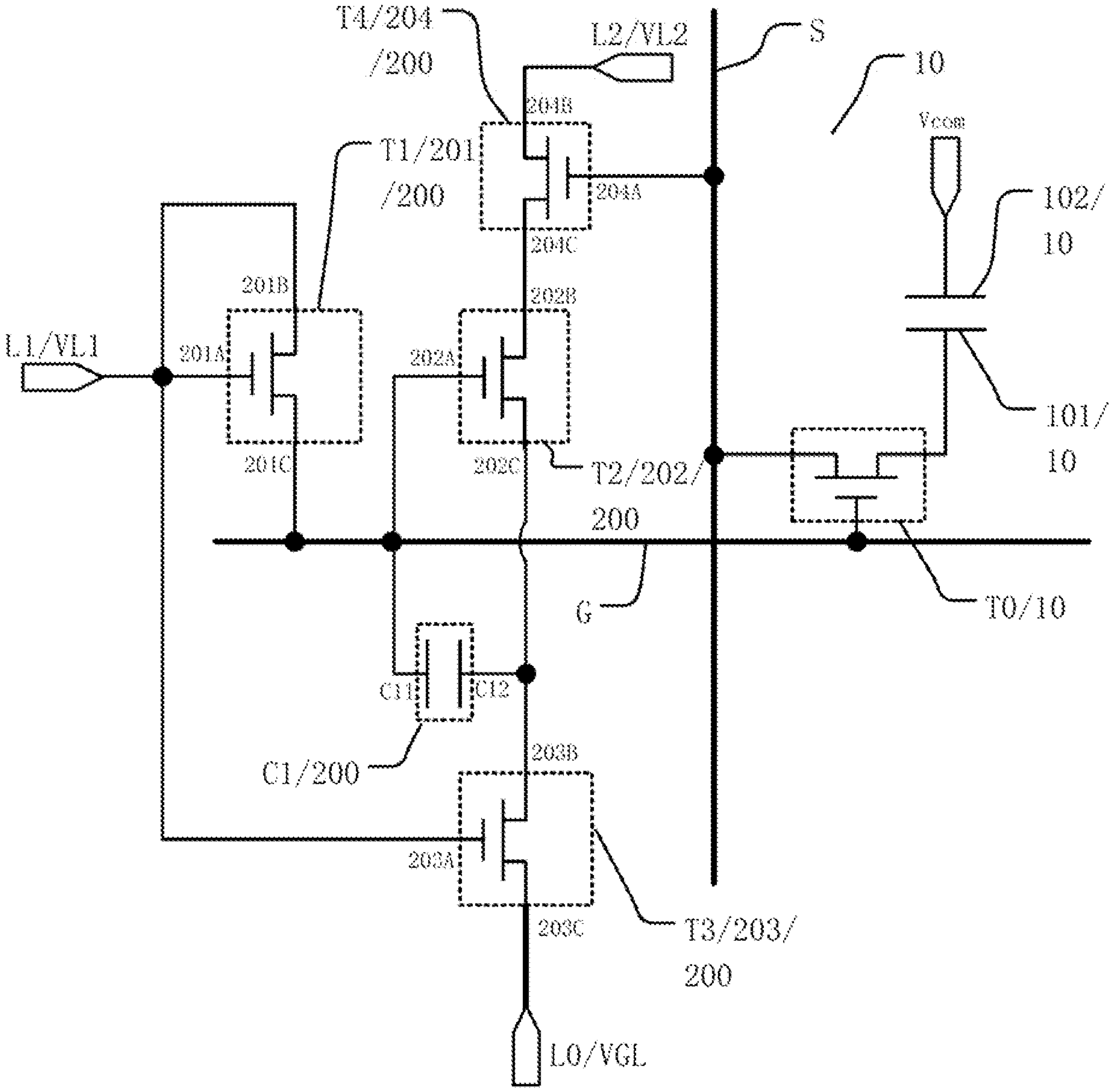
FIG. 12 illustrates another electrical connection diagram in FIG. 7.

FIG. 12 illustrates another electrical connection diagram in FIG. 7, referring to FIGS. 1, 7 and 12, optionally, in one embodiment, in the display area AA of the display panel 000, the pixel unit 10 includes a switching transistor T0, a pixel electrode 101 and a common electrode 102. A gate of the switching transistor T0 is electrically connected to the gate line G, a source of the switching transistor T0 is electrically connected to the data line S, a drain of the switching transistor T0 is electrically connected to the pixel electrode 101 coupled to the common electrode 102.

The embodiment explains that the display panel 000 can be an electronic display panel. The potential of the gate line G may be provided by an integrated circuit subsequently bound to the display panel 000. In the display area AA, the pixel unit 10 includes a switching transistor T0, a pixel electrode 101 and a common electrode 102. A gate of the switching transistor T0 is electrically connected to the gate line G. The switching transistor T0 is controlled to be turned on and off by the potential signal transmitted on the gate line G. When the switching transistor T0 is turned on, the source and the drain of the switching transistor T0 are conductive. The data potential signal transmitted on the data line S can be written into the pixel electrode 101 to form a grayscale potential required to display each grayscale of an image in each pixel unit 10. The pixel electrode 101 is coupled to the common electrode 102. The common electrode 102 is provided with a fixed common potential signal Vcom, and a driving electric field is formed between the pixel electrode 101 and the common electrode 102 to complete a display. The boost circuit 20 in the embodiment can realize an input of the first control signal value of low potential to the boost unit 200. The second control signal value of low potential is input to the boost unit 200, and the high potential is output from the boost unit 200 to the gate line G, so that the potential provided by the gate line G to the gate of the switching transistor T0 in the pixel unit 10 can be greater than the potential value written on the data line S (the potential provided by the gate line G to the gate of the switching transistor T0 in the pixel unit 10 is greater than the potential value written on the data line S of the source of the switching transistor T0 in the pixel unit 10), which ensures normal conduction between the source and drain of the switching transistor T0 in the pixel unit 10, and complete a charging of the pixel electrode 101 in the pixel unit 10 by the data line S. Furthermore, the driving power consumption of the panel can be reduced through a low-potential input, thereby ensuring normal driving signal of the display panel and display quality.

Optionally, a film layer structure of the display panel 000 includes a first substrate and a second substrate arranged oppositely (not shown). The first substrate includes a pixel electrode 101, a switching transistor T0, and a boost circuit 20, and the second substrate includes the common electrode 102. The first substrate can be understood as an array substrate. The switching transistor T0, pixel electrode 101 and other circuit structures in the pixel unit 10 in the display area AA and the boost circuit 20 in the non-display area NA can be formed in the array substrate. The second substrate can be regarded as an opposite substrate of the array substrate. The common electrode 102 that couples with the pixel electrode 101 to form an electric field can be made on aside of the opposite substrate. The common electrode 102 can have a whole-surface structure. The common potential signal Vcom on the common electrode 102 can be opposed by the first substrate and the second substrate. The integrated circuit transmits the common potential signal Vcom to the common electrode 102 through a conductive silver glue in the non-display area NA, which can make a structure simple and a signal transmission stable.

Figure 13:
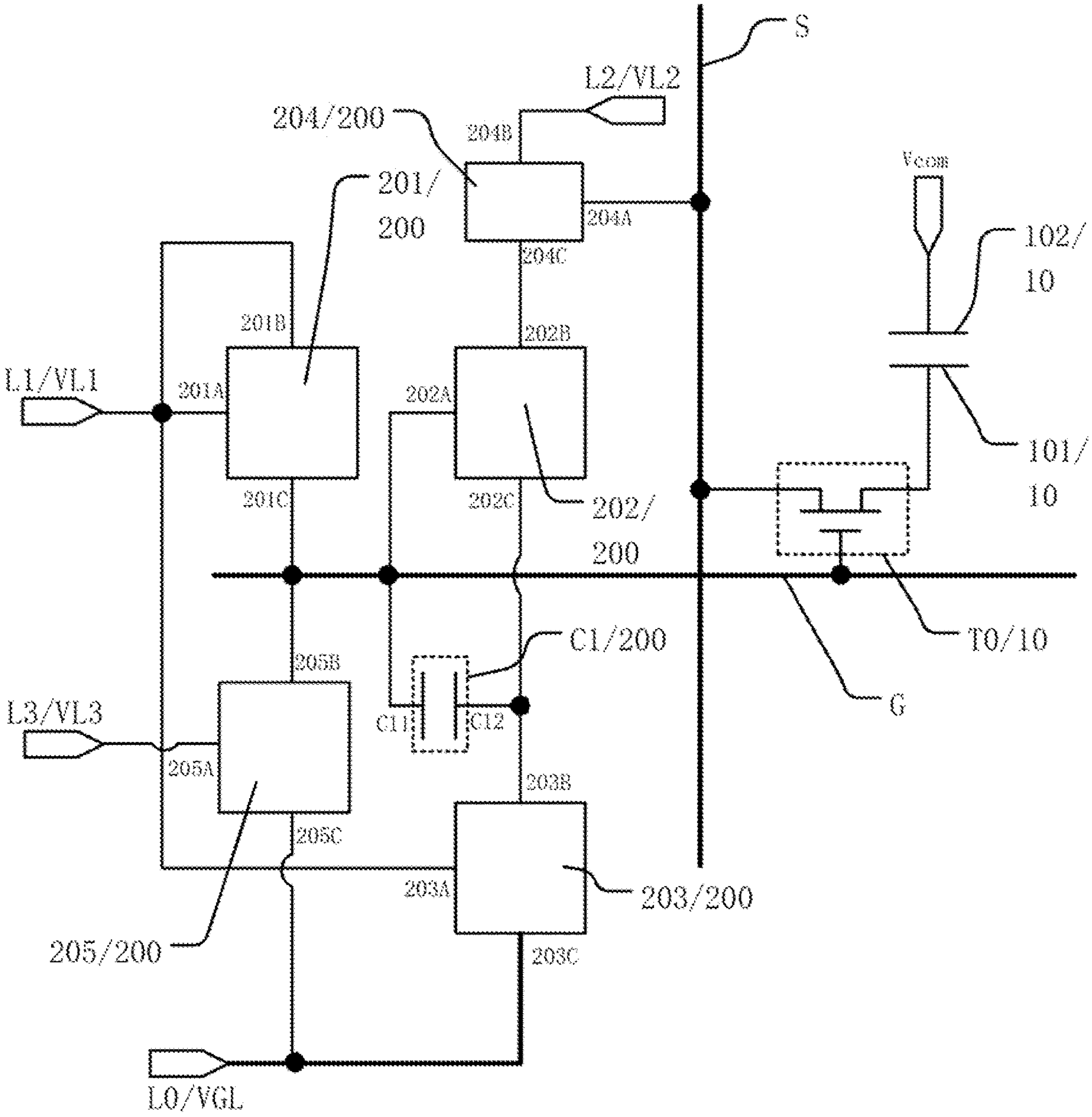
FIG. 13 illustrates another electrical connection diagram between boost units and pixel units in FIG. 1.

FIG. 13 illustrates another electrical connection diagram between boost units and pixel units in FIG. 1. Optionally, in one embodiment, referring to FIG. 1 and FIG. 13, each boost unit 200 of the boost circuit 20 also includes a reset module 205. A control end 205A of the reset module 205 is electrically connected to the third control signal line L3, a first end 205B of the reset module 205 is electrically connected to the gate line G, and a second end 205C of the reset module 205 is electrically connected to the first negative potential signal line L0.

The embodiment explains that in the boost circuit 20 provided in the non-display area NA of the display panel 000, each boost unit 200 also includes the reset module 205. Whether the first end 205B and the second end 205C of the reset module 205 are turned on or not can be controlled by a third control signal value VL3 provided on the third control signal line L3 in the display panel 000. Specifically, the control end 205A of the reset module 205 is electrically connected to the third control signal line L3, and the first end 205B of the reset module 205 is electrically connected to the gate line G. The second end 205C of the reset module 205 is electrically connected to the first negative potential signal line L0. The third control signal value VL3 provided on the third control signal line L3 controls whether a residual charge of the gate line G is discharged to the first negative potential signal line L0. After the bootstrap stage J2 of the boost circuit 20 is completed, the residual charge on the gate line G can be discharged to the first negative potential signal line L0, so that the switching transistor T0 of the pixel unit 10 is turned off, thereby realizing a clearing effect on the pixel unit 10, which is conducive to a display of a next frame.

Figure 14:
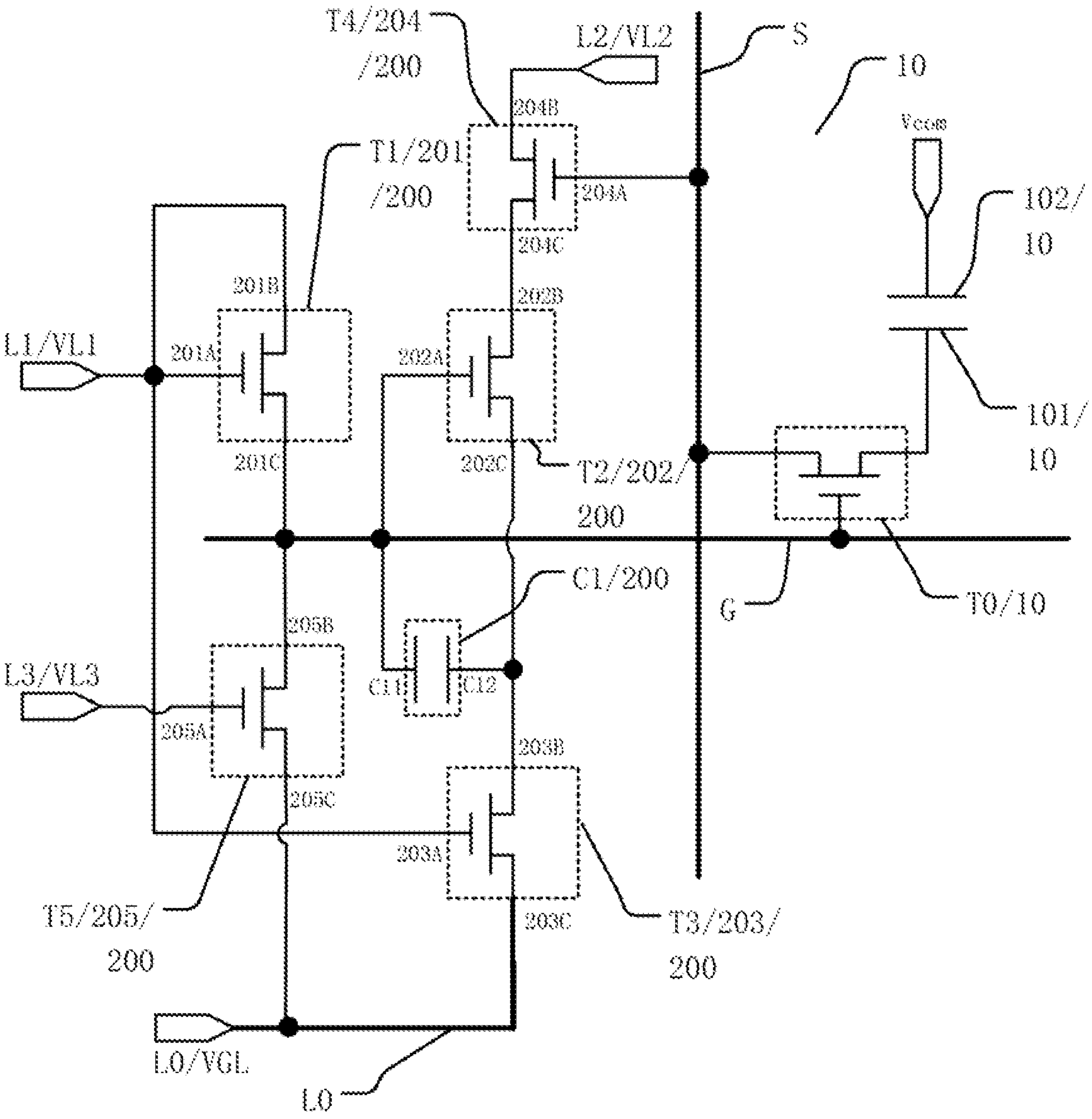
FIG. 14 illustrates an electrical connection diagram in FIG. 13.
Figure 15:
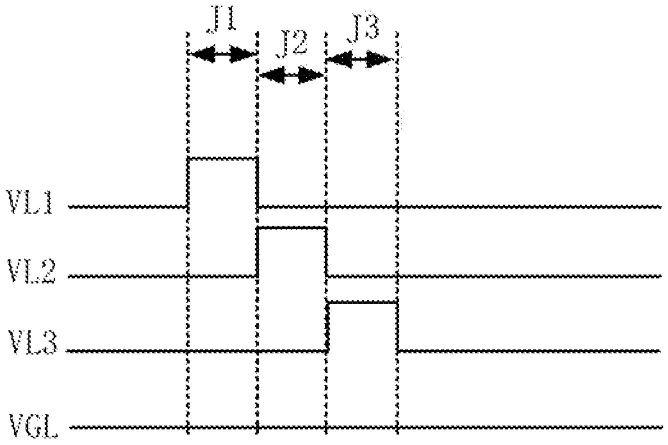
FIG. 15 illustrates a timing diagram of an input signal when a circuit structure in FIG. 14 works.

FIG. 14 illustrates an electrical connection diagram in FIG. 13. FIG. 15 illustrates a timing diagram of an input signal when a circuit structure in FIG. 14 works. Optionally, in one embodiment, the charging module 201 includes a first transistor T1, the first module 202 includes a second transistor T2, the initialization module 203 includes a third transistor T3, the strobe module 204 includes a fourth transistor T4, and the reset module 205 includes a fifth transistor T5. A gate of the first transistor T1 is electrically connected to the first control signal line L1, a source of the first transistor T1 is electrically connected to the gate of the first transistor T1, and a drain of the first transistor T1 is electrically connected to the gate line, a source of the fifth transistor T5, a gate of the second transistor T2, and the first electrode C11 of the first capacitor C1 respectively. A source of the second transistor T2 is electrically connected to a drain of the fourth transistor T4, and a drain of the second transistor T2 is electrically connected to the second electrode C12 of the first capacitor C1 and a source of the third transistor T3 respectively. A gate of the third transistor T3 is electrically connected to the first control signal line L1, and a drain of the third transistor T3 is electrically connected to the first negative potential signal line L0. A gate of the fourth transistor T4 is electrically connected to the data line S, and a source of the fourth transistor T4 is electrically connected to the second control signal line L2. A gate of the fifth transistor T5 is electrically connected to the third control signal line L3, and a drain of the fifth transistor T5 is electrically connected to the first negative potential signal line L0. Optionally, in one embodiment, the first transistor T1, the second transistor T2, the third transistor T3, the fourth transistor T4, the fifth transistor T5, and the switching transistor T0 are of a same type. For example, the first transistor T1, the second transistor T2, the third transistor T3, the fourth transistor T4, the fifth transistor T5, and the switching transistor T0 are all N-type transistors, and the first control signal line L1, the second control signal line L2, and the third control signal line L3 all provide a same high-potential signal, so that each transistor is turned on under the high-potential signal.

As shown in FIGS. 14 and 15, taking the first transistor T1, the second transistor T2, the third transistor T3, the fourth transistor T4, the fifth transistor T5, and the switching transistor T0 as N-type transistors as an example, a working process of each boost unit 200 of the boost circuit 20 can be as follows.

In the charging stage J1, the first control signal value VL1 provided by the first control signal line L1 is high (such as +5V), the second control signal value VL2 provided by the second control signal line L2 is low and the third control signal value VL3 provided by the third control signal line L3 is low. The first transistor T1 and the third transistor T3 are turned on under the control of the first control signal value VL1 of high potential. The fifth transistor T5 is turned off under the control of the third control signal value VL3 of low potential. The first control signal value VL1 of high potential (e.g., +5V) is gradually transmitted to the gate line G. The signal value on the gate line G gradually increases to the first control signal value VL1 of high potential (e.g., +5V). The signal value on the first electrode C11 of a capacitor C1 also gradually increases to the first control signal value VL1 of high potential (e.g., +5V). The first negative potential signal value VGL of low potential (e.g., −25V) provided by the first negative potential signal line L0 is transmitted to the second electrode C12 of the first capacitor C1, and the signal value on the second electrode C12 of the first capacitor C1 is the first negative potential signal value VGL of low potential. The first control signal value VL1 of high potential is transmitted to the gate of the second transistor T2 through the first transistor T1, so that the gate potential of the second transistor T2 gradually increases, and the second transistor T2 is gradually turned on.

In the bootstrap stage J2, if the potential signal transmitted on the data line S is a negative potential signal (e.g., −15V), the fourth transistor T4 is turned off. The first control signal value VL1 provided by the first control signal line L1 is low, the second control signal value VL2 provided by the second control signal line L2 is high, and the third control signal value VL3 provided by the third control signal line L3 is low. The first transistor T1 and the third transistor T3 are turned off under the control of the first control signal value VL1 of low potential, and the fifth transistor T5 remains off under the control of the third control signal value VL3 of low potential. The gate of the second transistor T2 has already received the high potential signal (e.g., +5V) provided in the charging stage J1, so the second transistor T2 remains to be turned on. However, since the fourth transistor T4 is turned off, the second control signal value VL2 of high potential cannot be transmitted to the second electrode C12 of the first capacitor C1 through the second transistor T2, and the potential of the second electrode C12 of the first capacitor C1 remains to be the first negative potential signal value VGL of low potential (e.g., −25V) provided by the first negative potential signal line L0 in the charging stage J1. The first electrode C11 of the first capacitor C1 remains to be the first control signal value VL1 of high potential (e.g., +5V) provided by the first control signal line L1. That is, the first capacitor C1 does not need to be bootstrapped and the potential of the first electrode C11 of the first capacitor C1 does not need to be increased through coupling. The signal value transmitted on the gate line G remains to be the first control signal value VL1 of high potential (e.g., +5V) provided by the first control signal line L1 in the charging stage J1. Since the first control signal value VL1 of high potential (e.g., +5V) must be greater than the negative potential signal (such as −15V) transmitted on the data line S, there is no need to increase the potential of the gate line G to ensure that the switching transistor in the pixel unit 10 can be turned on normally.

If the potential signal transmitted on the data line S is a positive potential signal (e.g., +15V), the fourth transistor T4 is turned on. The first control signal value VL1 provided by the first control signal line L1 is low, the second control signal value VL2 provided by the second control signal line L2 is high (e.g., +5V), and the third control signal value VL3 provided by the third control signal line L3 is low. The first transistor T1 and the third transistor T3 are turned off under the control of the first control signal value VL1 of low potential, and the fifth transistor T5 remains to be turned off under the control of the third control signal value VL3 of low potential. The gate of the second transistor T2 is provided with the high potential signal (such as +5V) in the charging stage J1, so the second transistor T2 remains to be turned on. Since the potential signal value transmitted on the data line S is positive (e.g., +15V) and greater than the second control signal value VL2 of high potential (e.g., +5V), the fourth transistor T4 is turned on. The second control signal value VL2 of high potential (such as +5V) is transmitted to the second electrode C12 of the first capacitor C1 through the second transistor T2. The potential of the second electrode C12 of the first capacitor C1 increases from the first negative potential signal value VGL of low potential (e.g., −25V) to the second control signal value VL2 of high potential (e.g., +5V). The potential of the first electrode C11 of the first capacitor C1 is coupled to a higher potential (e.g., the +5V of the charging stage J1 is coupled to +35V). The first electrode C11 of the first capacitor C1 is electrically connected to the gate line G, so the signal potential transmitted on the gate line G is also increased to a higher potential value (e.g., +35V). greater than the positive potential signal value (such as +15V) transmitted on the data line S. Therefore, increasing the potential of the gate line G through the bootstrap stage J2 can ensure that the switching transistor T0 in the pixel unit 10 can be turned on normally.

In a clearing stage J3, the first control signal value VL1 provided by the first control signal line L1 is low, the second control signal value VL2 provided by the second control signal line L2 is low, and the third control signal value VL3 provided by the third control signal line L3 is high. The first transistor T1 and the third transistor T3 are turned off under the control of the first control signal value VL1 of low potential, and the fifth transistor T5 is turned on under the control of the third control signal value VL3 of high potential. The third control signal value VL3 provided on the third control signal line L3 controls whether a residual charge of the gate line G is discharged to the first negative potential signal line L0. After the bootstrap stage J2 of the boost circuit 20 is completed, the residual charge on the gate line G can be discharged to the first negative potential signal line L0, so that the switching transistor T0 of the pixel unit 10 is turned off, thereby realizing a clearing effect on the pixel unit 10 and preparing for the next frame, which is conducive to a display of a next frame. In the embodiment, after the bootstrap stage J2 of the boost circuit 20 is completed, the fifth transistor T5 of the reset module 205 is configured to discharge the residual charge of the gate line G to the first negative potential signal line L0 to achieve a clearing effect on the pixel unit 10, which is conducive to a display of a next frame.

Figure 16:
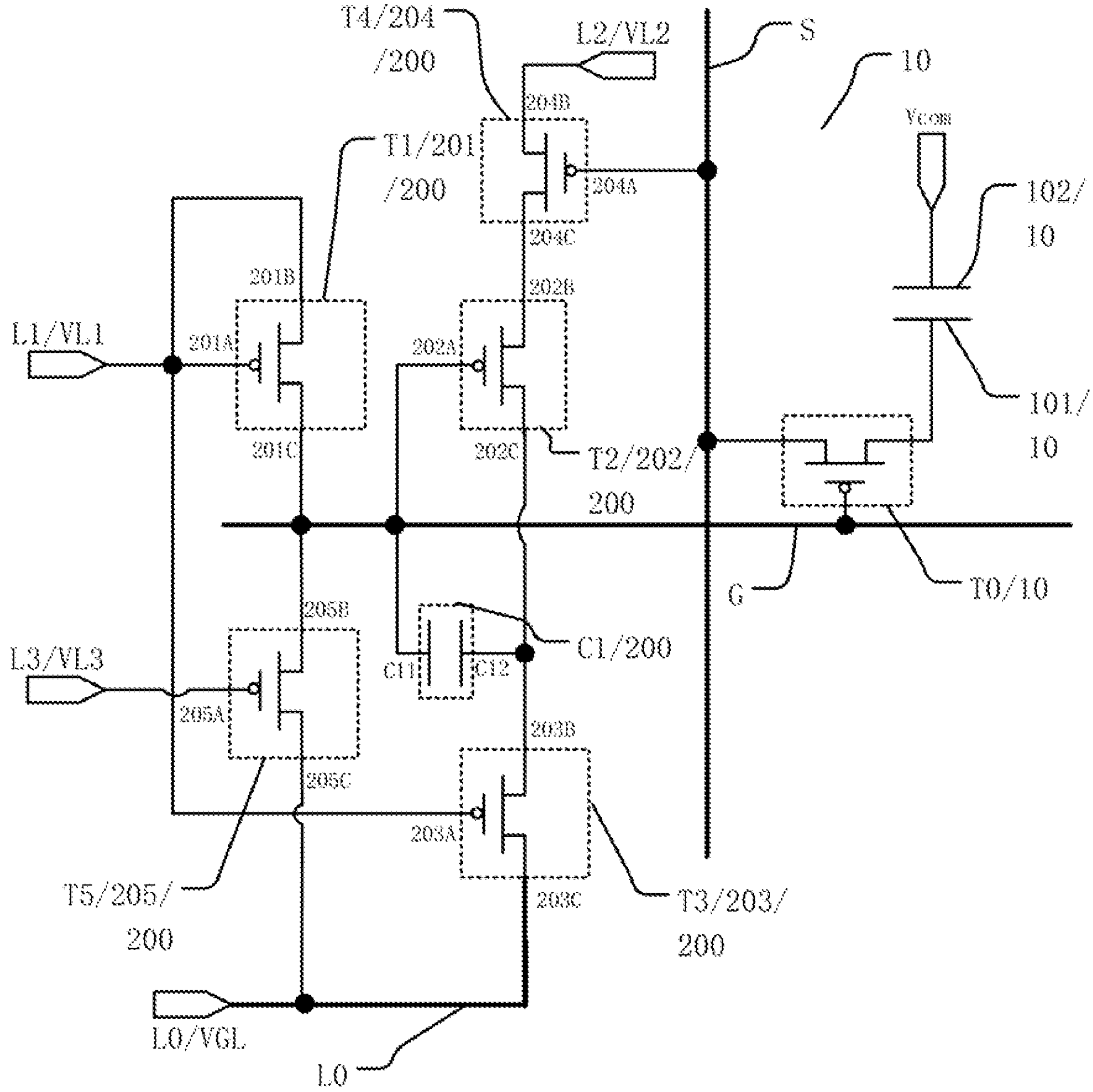
FIG. 16 illustrates another electrical connection diagram in FIG. 13.
Figure 17:
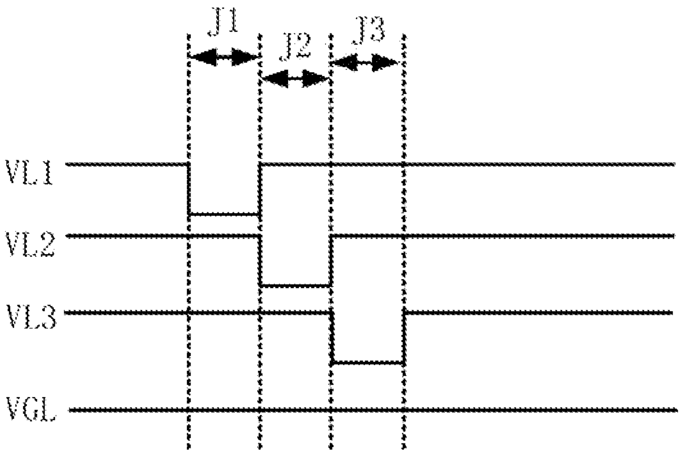
FIG. 17 illustrates a timing diagram of an input signal when a circuit structure in FIG. 16 works.

It can be understood that FIG. 14 and FIG. 15 of the embodiment only take the first transistor T1, the second transistor T2, the third transistor T3, the fourth transistor T4, and the fifth transistor T5 and the switching transistor T0 included in the pixel unit 10 as an N-type transistors as an example for illustration. FIG. 16 illustrates another electrical connection diagram in FIG. 13. FIG. 17 illustrates a timing diagram of an input signal when a circuit structure in FIG. 16 works. When the first transistor T1, the second transistor T2, the third transistor T3, the fourth transistor T4, and the fifth transistor T5 are P-type transistors, and the switching transistor T0 included in the pixel unit 10 is a P-type transistor, the first control signal line L1, the second control signal line L2, and the third control signal line L3 all provide a same low potential signal. The gates of the first transistor T1, the second transistor T2, and the third transistor T3 are turned on under the first control signal value VL1 of low potential, and the gate of the fifth transistor T5 is turned on under the third control signal value VL3 of low potential. Although the second control signal value VL2 is low, the second control signal value VL2 of low potential needs to be greater than the first negative potential signal value VGL of low potential to realize a bootstrap effect, so that the potential provided by the gate line G in the pixel unit 10 to the gate of the switching transistor in the pixel unit 10 is greater than the potential value written on the data line of the source/drain of the switching transistor in the pixel unit 10, thereby ensuring normal writing of the high potential on the data line S to the pixel unit 10 and display quality.

Figure 18:
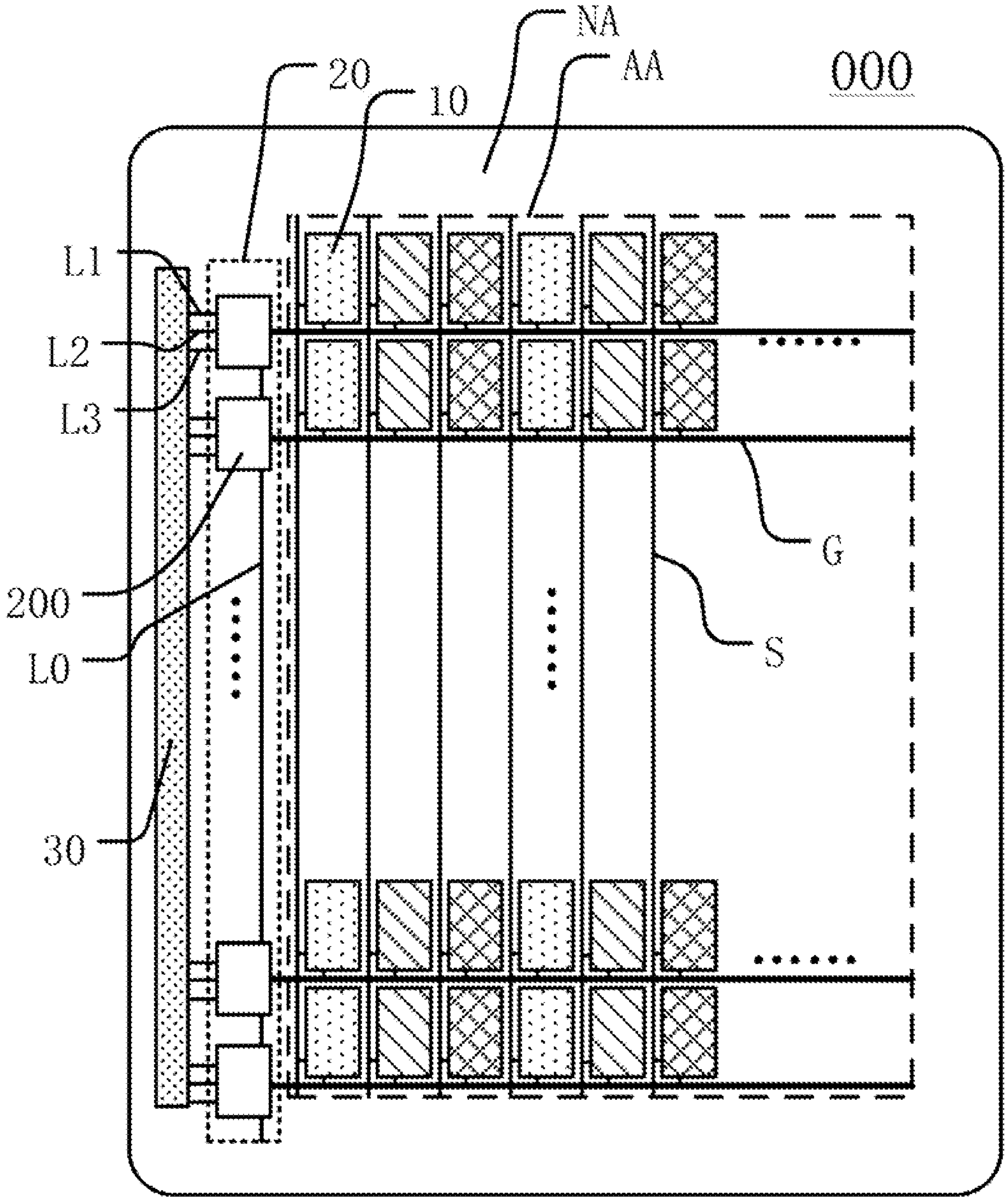
FIG. 18 illustrates another planar view of a display panel consistent with various embodiments of the present disclosure.
Figure 19:
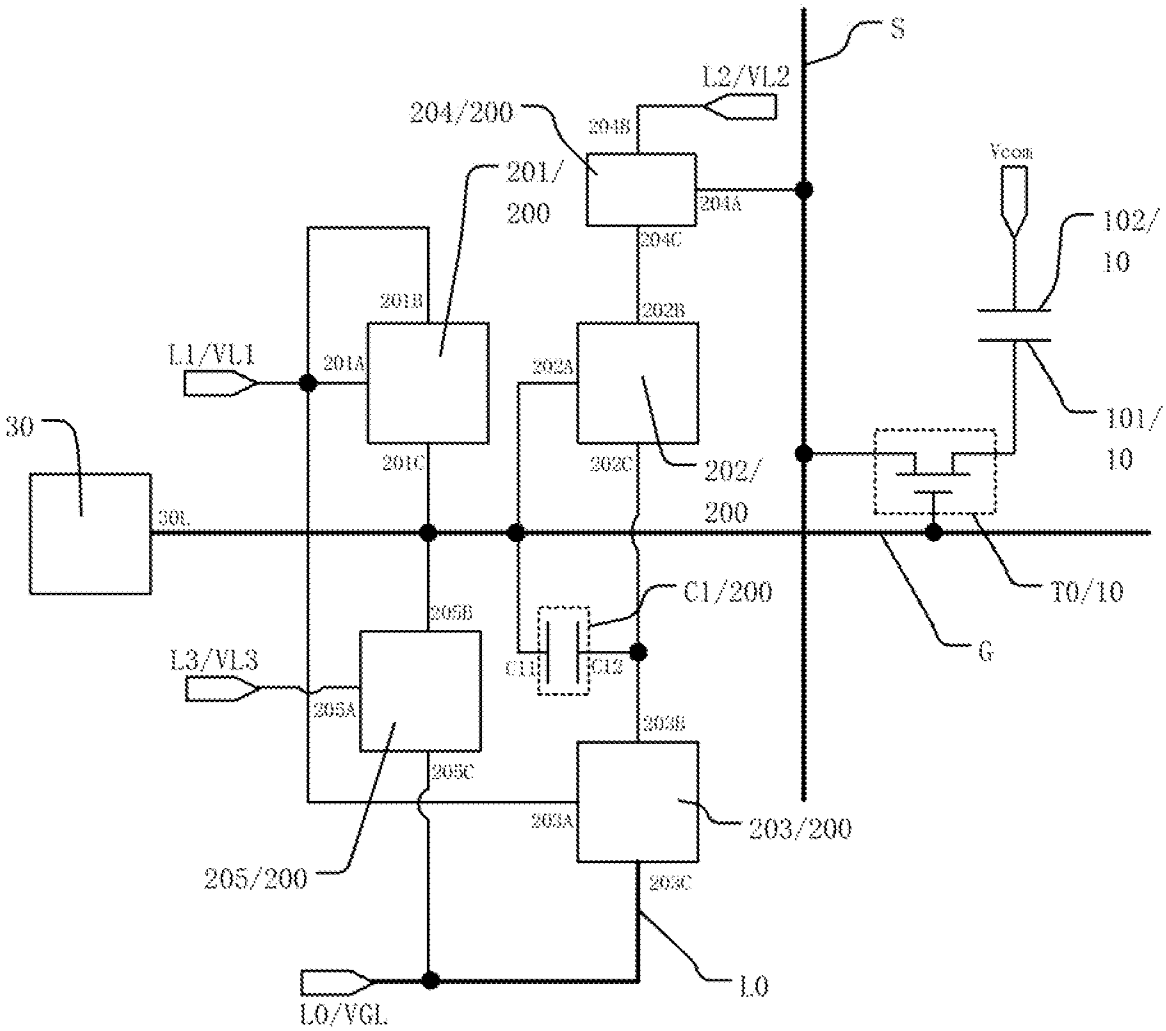
FIG. 19 illustrates an electrical connection diagram between first driving circuits, boost units and pixel units in FIG. 18.

FIG. 18 illustrates another planar view of a display panel consistent with various embodiments of the present disclosure. FIG. 19 illustrates an electrical connection diagram between first driving circuits, boost units and pixel units in FIG. 18. Optionally, in one embodiment, the non-display area NA of the display panel 000 includes a first driving circuit 30. The first driving circuit 30 includes a low-potential signal end 30L electrically connected to the first end 205B of the reset module 205.

The embodiment explains that the non-display area NA of the display panel 000 may also include other circuit structures, such as a first driving circuit 30. The first driving circuit 30 includes a low-potential signal end 30L. It can be understood that the embodiment does not specifically limit a structure of the first driving circuit 30, only if the first driving circuit 30 includes a low-potential signal end 30L. That is, the first driving circuit 30 can be any circuit structure including a low-level signal end 30L in the display panel 000. For example, the first driving circuit 30 can be a gate driving circuit including a pull-down module, and the pull-down module includes a low-potential signal end 30L. Since the first driving circuit 30 includes a low-potential signal end 30L, the first driving circuit 30 also needs to be internally connected to the first negative-potential signal value VGL provided by the low-potential signal end 30L. Generally, a signal input of a circuit in the display panel 000 can be provided through an integrated circuit subsequently bound to the display panel. Therefore, in the embodiment, the low-potential signal end 30L of the first driving circuit 30 is electrically connected to the first end 205B of the reset module 205, so that the first negative-potential signal values VGL of a plurality of circuit structures in the display panel are all connected. The first negative potential signal value VGL can be transmitted to the low-potential signal end 30L of the first driving circuit 30, and the first end 205B and the second end 205C of the reset module 205 can also be connected in the clearing stage J3 of the boost circuit 20. When the first end 205B and the second end 205C of the reset module 205 are turned on, a signal is transmitted to the gate line G of the first end 205B of the reset module 205. The low-potential signal end 30L connected to the first driving circuit 30 of the embodiment is connected to the first end 205B of the reset module 205 in the clearing stage J3. When the boost circuit 20 does require boosting, the charge on the gate line G can be effectively discharged to the low potential of the first driving circuit 30 through a conduction of the first end 205B and the second end 205C of the reset module 205, thereby keeping the potential of the gate line G stable and the switching transistor T0 in the pixel unit 10 continuously turned off.

Optionally, in one embodiment, the first driving circuit 30 can be a gate driving circuit. An output end of the gate driving circuit can be used as an input end of the boost circuit. The gate driving circuit can include a plurality of cascaded shift registers (not shown). Output ends of the shift registers at each level can be used to be connected to the input ends of the boost units 200, so that signals can be input to each boost unit 200 of the boost circuit 20 one by one using a shift register function, thereby achieving an effect of driving of the gate lines G of the display panel 000 row by row.

In the prior art, in a display panel using a gate driving circuit, the shift register circuits at each level can generally only output two different high and low potential signals. For example, in the prior art, the gate driving circuit is used to provide scan drive signals to the gate lines, generally only two different potential values of +15V and −25V can be output, and a potential difference between the two different potential values is 40V. When the potential provided on the data line S connected to the source of the switching transistor T in the pixel unit 10 in the display area AA is negative (such as −15V). The potential on the gate line G output by the gate driving circuit to control opening of the N-type switching transistor T0 can only be +15V, although the gate potential of the switching transistor T0 (+15V) is greater than the drain potential of the switching transistor T0 (−15V), the gate driving circuit requires a large driving power consumption.

In the embodiment, after the gate driving circuit is electrically connected to the boost circuit, the driving power consumption can be greatly reduced by arranging the boost circuit 20. For example, when the potential provided on the data line S connected to the source of the switching transistor T0 in the pixel unit 10 in the display area AA is negative (e.g., −15V), the gate potential of the switching transistor T0 in the pixel unit 10 only needs to be greater than-15V to turn on the switching transistor. For example, through an electrical connection between the shift register circuit in the gate driving circuit and the boost unit 200, a signal output to the gate line is +5V, which is lower compared to the high potential value used in the prior art. That is, the gate potential of the first transistor T1 in the boost unit 200 may be +5V output by the gate driving circuit. When the potential provided on the data line S is negative (e.g., −15V), through a setting of the fourth transistor T4, the boost unit 200 does not boost the voltage on the gate line G, and the potential value (e.g., +5V) provided by the first control signal line L1 can be directly provided to the gate line G, so that the switching transistor T0 of the pixel unit 10 is turned on. When the potential provided on the data line S is positive (e.g., +15V), through the setting of the fourth transistor T4, the boost unit 200 boosts the voltage on the gate line G when the fourth transistor T4 is turned on. Therefore, the potential value (e.g., +5V) provided by the first control signal line L1 can be boosted to exceed the positive voltage provided on the data line S and transmitted to the gate line G. In an example provided in the embodiment, +5V from the charging stage J1 is coupled and increased to +35V, which exceeds the +15V positive potential on the data line S and activates the switching transistor T0 of the pixel unit 10. Therefore, a combination of the boost circuit 200 and the gate driving circuit of the embodiment can satisfy requirements for normal driving of the pixel unit 10 and at least reduce the high potential value output by the gate driving circuit (e.g., the high potential output by the existing technology is +15V, and the high potential output by this embodiment can be reduced to +5V), which can greatly reduce a potential difference between the high and low potentials output by the gate driving circuit, and further save driving power consumption of the display panel.

Figure 20:
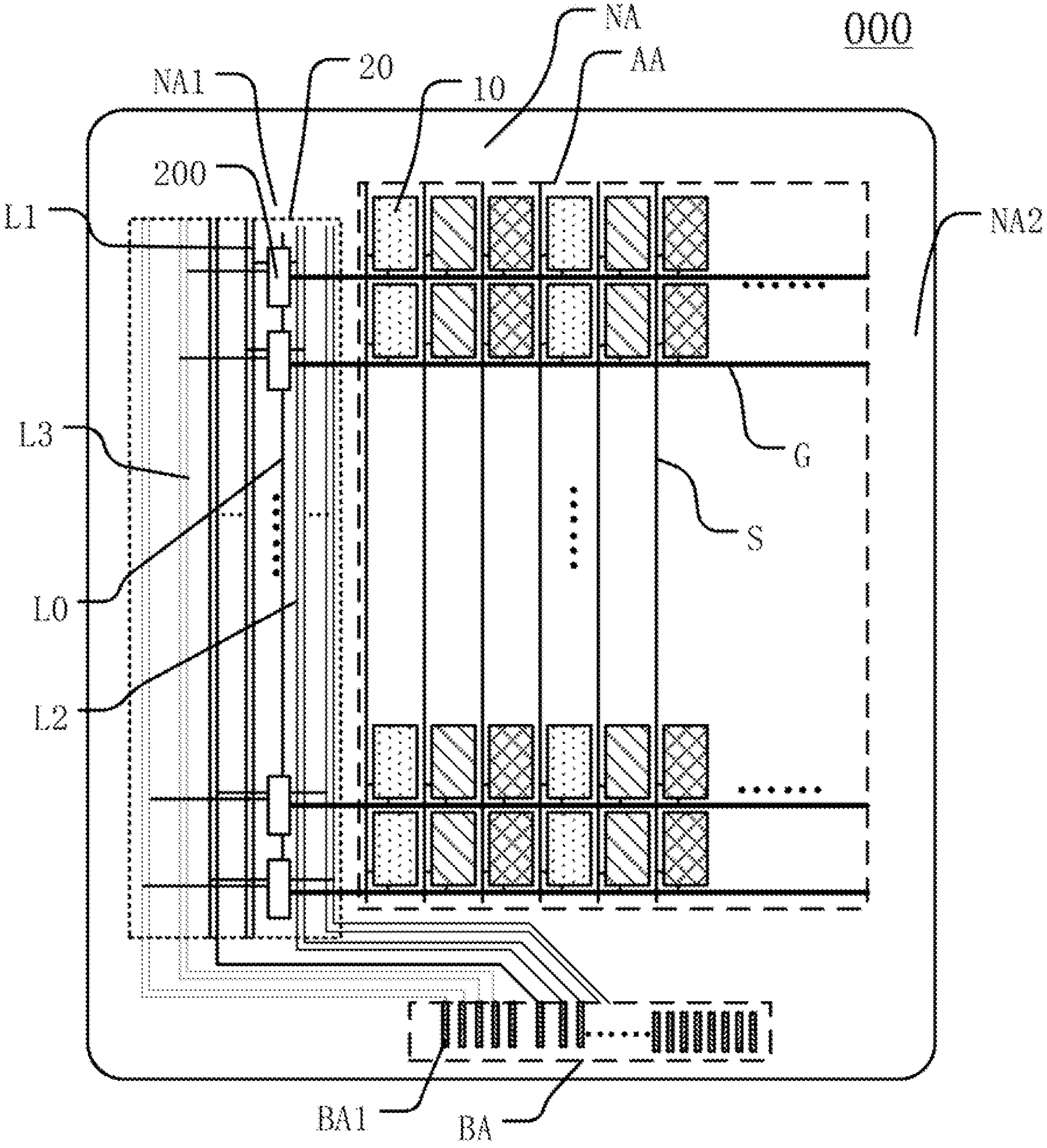
FIG. 20 illustrates another planar view of a display panel consistent with various embodiments of the present disclosure.

FIG. 20 illustrates another planar view of a display panel consistent with various embodiments of the present disclosure. Referring to FIGS. 14, 15 and 20, optionally, in one embodiment, the non-display area NA includes a bonding area BA, the bonding area BA includes a plurality of conductive pads BA1, and the gate lines G are electrically connected to the conductive pads BA.

The embodiment explains that the non-display area NA of the display panel includes a bonding area BA, and the bonding area BA includes a plurality of conductive pads BA1. The plurality of conductive pads BA1 in the bonding area BA can be used for subsequent display panel 000 bonding integrated circuits (IC, not shown). The driving of the gate line G can be realized through the integrated circuit that is subsequently bound to the bonding area BA, that is, the gate line G is electrically connected to the conductive pad BA. In the embodiment, the gate line G is electrically connected to the conductive pad BA through the boost circuit 20. For example, an end of the first control signal line L1, an end of the second control signal line L2, and an end of the third control signal line L3 of each boost unit 200 in the boost circuit 20 can be connected to different conductive pads BA1 in the binding area BA. The other end of the control signal line L1, the other end of the second control signal line L2, and the other end of the third control signal line L3 are respectively connected to input ends of boost units 200 in the boost circuit 20. The output end of each boost unit 200 in the boost circuit 20 can be connected to the gate line G, so that the potential signal on the gate line G can be directly bound to the integrated circuit by the display panel 000. Moreover, in the embodiment, a setting of the boost circuit 20 enables a transmission of a high-potential signal to the gate line G even when the potential signal value provided by the integrated circuit subsequently bound to the display panel 000 is relatively low, thereby realizing low-potential input and high-potential output, which is conducive to saving power consumption and ensure display quality.

It can be understood that in the embodiment, in the display panel 000, the potential boost unit 200 is electrically connected to the conductive pad BA1 through the first control signal line L1, so that the potential signal on the gate line G can be directly provided by the integrated circuit bound to the display panel 000. To drive the gate lines G one by one in the display panel 000, different boost units 200 may be arranged to be electrically connected to different first control signal lines L1, and different boost units 200 may be arranged to be electrically connected to different second control signal lines L2, and different boost units 200 may be arranged to be electrically connected to different third control signal lines L3 to ensure that the pixel units 10 are turned on row by row. In the embodiment, FIG. 20 only illustrates number of signal lines in the non-display area NA. FIG. 20 only uses lines of different thicknesses to distinguish the first control signal line L1, the second control signal line L2, and the third control signal line L3, and does not mean that the actual thicknesses of the three are different. During specific implementations, number of control signal lines included in the non-display area NA can be arranged according to actual needs.

Figure 21:
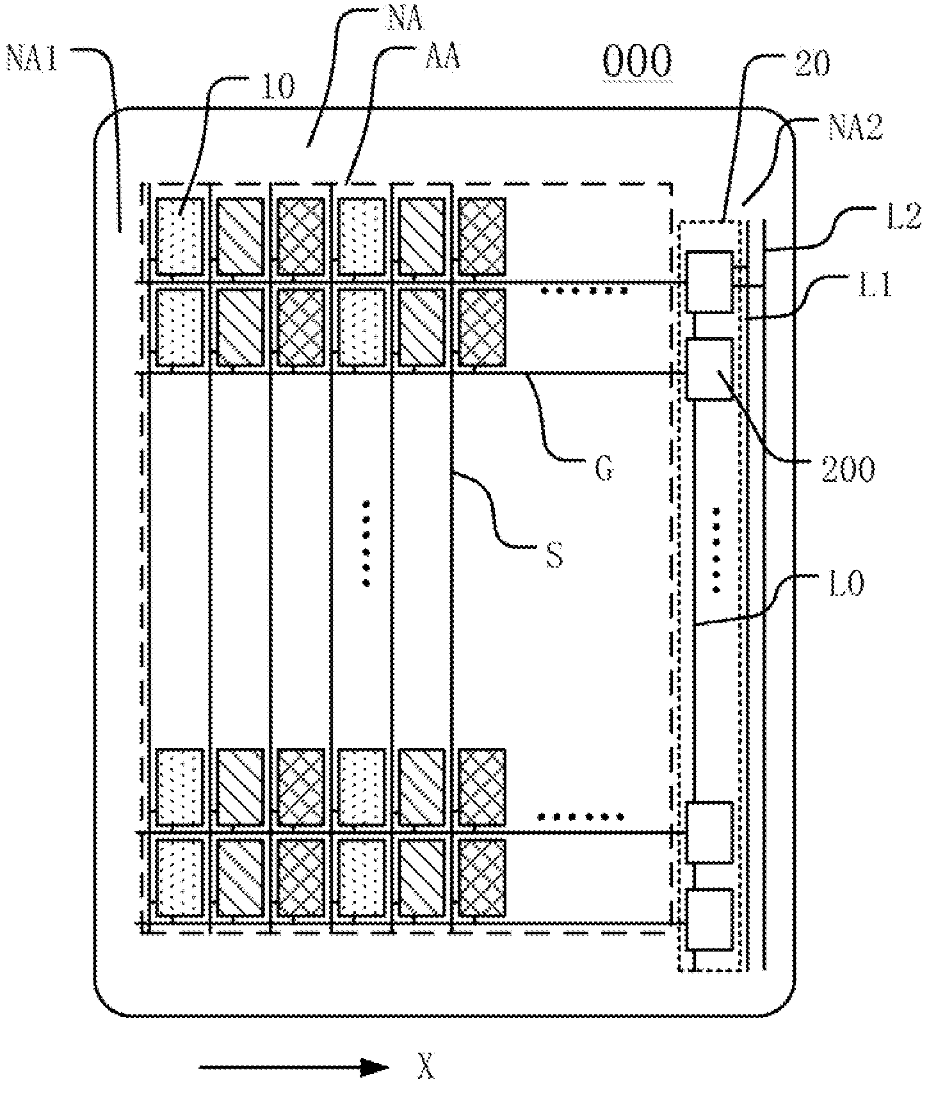
FIG. 21 illustrates another planar view of a display panel consistent with various embodiments of the present disclosure.
Figure 22:
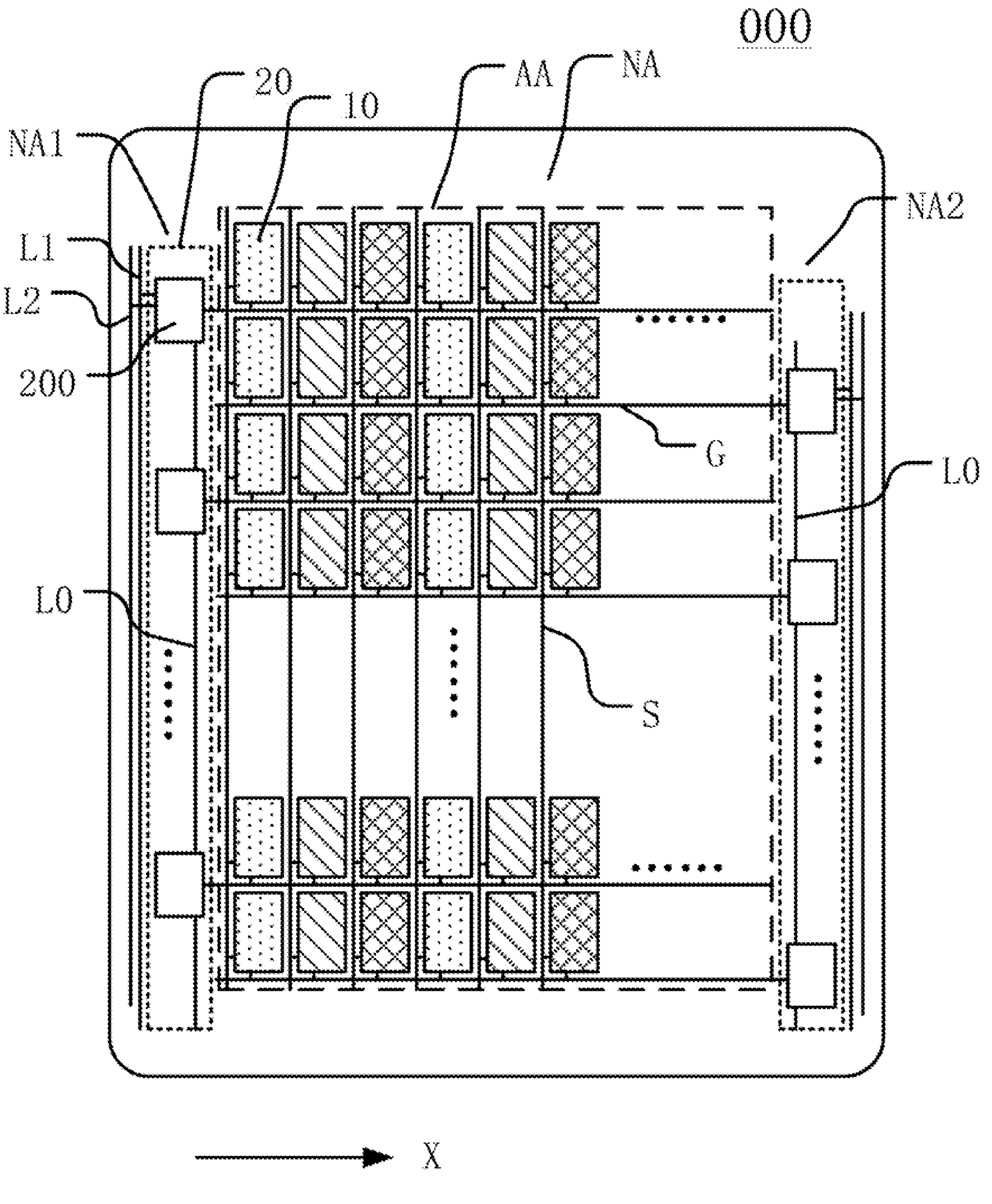
FIG. 22 illustrates another planar view of a display panel consistent with various embodiments of the present disclosure.

FIG. 21 illustrates another planar view of a display panel consistent with various embodiments of the present disclosure. FIG. 22 illustrates another planar view of a display panel consistent with various embodiments of the present disclosure. Referring to FIGS. 1, 14, 15, 21 and 22, optionally, in one embodiment, the gate line G of the display panel 000 extends along a first direction X. Along the first direction X, the non-display area NA includes a first non-display area NA1 and a second non-display area NA2 on opposite sides of the display area AA. The boost circuit 20 is in the first non-display area NA1 and/or the second non-display area NA2.

The embodiment explains that the non-display area NA of the display panel 000 includes a first non-display area NA1 and a second non-display area NA2 on opposite sides of the display area AA. The boost circuit 20 provided in the non-display area NA of the display panel 000 may be in the first non-display area NA1 (as shown in FIG. 1), or the boost circuit 20 may be in the second non-display area NA2 (as shown in FIG. 21), or part of the boost circuit 20 may be in the first non-display area NA1, and part of the boost circuit 20 may be in the second non-display area NA2 (as shown in FIG. 22). As shown in FIG. 22, part of the boost circuit 20 is in the first non-display area NA1, and part of the boost circuit 20 is in the second non-display area NA2, the gate lines G in odd-numbered rows are electrically connected to the boost circuit 20 in the first non-display area NA1, and the gate lines G in even-numbered rows are electrically connected to the boost circuit 20 in the second non-display area NA2, so that signal transmissions of the boost circuit 20 to the gate lines G can be made more uniform.

It can be understood that the embodiment does not specifically limit the area where the boost circuit 20 are installed, as long as the non-display area NA has enough space to place the boost circuit 20 without affecting other structures of the non-display area NA. It can be understood that to clearly illustrate the structure of the embodiment, FIG. 21 and FIG. 22 only illustrate the first control signal lines L1 and the second control signal lines L2 connected to part of the boost units 200, and the control signal lines connected to the remaining boost units 200 can be referred to FIG. 20.

Figure 23:
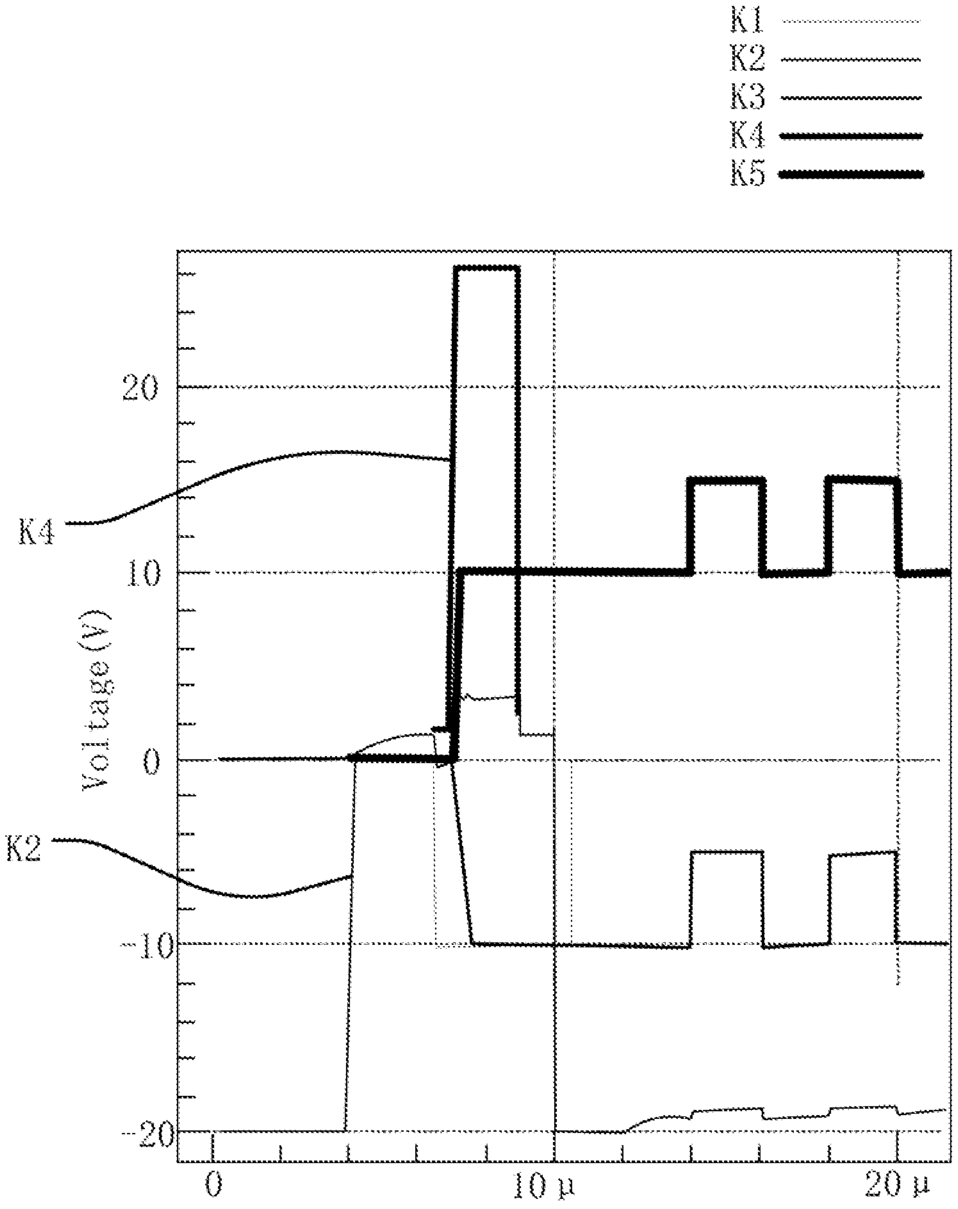
FIG. 23 illustrates a simulation diagram of a driving signal of a circuit structure in FIG. 14.

FIG. 23 illustrates a simulation diagram of a driving signal of a circuit structure in FIG. 14. Optionally, referring to FIGS. 1,7, 14, 15 and 23, in FIG. 23, the abscissa represents a work process, the ordinate represents a potential. Curve K1 represents a change of the potential value provided by the data line S in the display panel 000. Curve K2 represents a change in the potential value transmitted on the gate line G when the data line S in the display panel 000 provides a negative first data potential value Vdata1. Curve K3 represents a change of the potential value written on the pixel electrode 101 of the pixel unit 10 when the data line S in the display panel 000 provides a negative first data potential value Vdata1. Curve K4 represents a change in the potential value transmitted on the gate line G when the data line S in the display panel 000 provides a positive second data potential value Vdata2. Curve K5 represents a change of the potential value written on the pixel electrode 101 of the pixel unit 10 when the data line S in the display panel 000 provides a negative second data potential value Vdata2. It can be seen from the curve K2 and the curve K4 that, when the data line S provides the negative first data potential value Vdata1, there is no need to increase the potential of the gate line G, the potential value transmitted on the gate line G can be greater than the negative first data voltage value Vdata1 provided by the data line S, which can ensure that the switching transistor T0 of the pixel unit 10 is normally turned on. The data line S provides a negative first data voltage value Vdata1 that can be charged to the pixel electrode 101 of the pixel unit 10 written with a voltage value that enables display. When the data line S provides a negative first data potential value Vdata1, there is no need to raise the potential of the gate line G. The potential value transmitted on the gate line G can be increased to be greater than the negative first data potential value Vdata1 provided by the data line S, which ensure that the switching transistor T0 of the pixel unit 10 is turned on normally, the data line S provides a positive second data voltage value Vdata2 that can be charged to the pixel electrode 101 of the pixel unit 10, the pixel electrode 101 of the pixel unit 10 is written with a potential value capable of realizing display, thereby saving panel driving power consumption in the bootstrap stage J2.

Referring to FIGS. 1-4, optionally, a driving method for display panel is provided in one embodiment. The driving method is applied to the display panel 000 in the above embodiments to perform driving display work. The driving method includes the charging stage J1 and the bootstrap stage J2.

In the charging stage J1, the first control signal value VL1 provided by the first control signal line L1 controls the first end 201B and the second end 201C of the charging module 201 to be turned on. The first control signal value VL1 provided by the first control signal line L1 controls the first end 203B and the second end 203C of the initialization module 203 to be turned on. The first control signal value VL1 is transmitted to the gate line G, the control end 202A of the first module 202, and the first electrode C11 of the first capacitor C1 respectively. The second electrode C12 of the first capacitor C1 is the first negative potential signal value VGL transmitted by the first negative potential signal line L0. In the bootstrap stage J2, the first control signal value VL1 controls the first end 202B and the second end 202C of the first module 202 to be conductive.

In the driving method of the display panel 000 provided in the embodiment, when driving, the boost circuit 20 works in the charging stage J1, and the first control signal line L1 provides the first control signal value VL1. Under the control of the first control signal value VL1, the first end 201B and the second end 201C of the charging module 201 are conductive, and the first end 203B and the second end 203C of the initializing module 203 are conductive. The first control signal value is transmitted to the gate line G, the control end 202A of the first module 202 and the first electrode C11 of the first capacitor C1 respectively. The first negative potential signal value VGL provided by the first negative potential signal line L0 is transmitted to the second electrode C12 of the first capacitor C1.

In the bootstrap stage J2, the first control signal value VL1 controls the first end 202B and the second end 202C of the first module 202 to be connected. The second control signal line L2 provides the second control signal value VL2. The second control signal value VL2 is transmitted to the second electrode C12 of the first capacitor C1. The potential of the second electrode C12 of the first capacitor C1 is increased, and the potential of the first electrode C11 of the first capacitor C1 is coupled and increased by the second electrode C12 of the first capacitor C1. Therefore, in the charging stage J1 of the boost unit 200 of the boost circuit 20, the potential signal value on the second electrode C12 of the first capacitor C1 is a smaller first negative potential signal value VGL of negative value provided by the first negative potential signal line L0, and the potential signal value on the first pole C11 of the first capacitor C1 is the first control signal value provided by the first control signal line L1. In the bootstrap stage J2, after the first control signal value VL1 provided by the first control signal line L1 further controls the connection between the first end 202B and the second end 202C of the first module 202, the second control signal value VL2 provided by the second control signal line L2 can be transmitted to the second electrode C12 of the first capacitor C1 electrically connected to the second end 202C of the first module 202, so that the potential signal on the second electrode C12 of the first capacitor C1 is a larger second control signal value VL2 provided by the second control signal line L2. Since the second control signal value VL2 provided by the second control signal line L2 is greater than the first negative potential signal value VGL provided by the first negative potential signal line L0, and the first capacitor C1 has a bootstrap coupling effect, when the potential signal on the second electrode C12 of the first capacitor C1 increases from the smaller first negative potential signal value VGL to the larger second control signal value VL2, the second electrode C12 of the first capacitor C1 is charged twice. The potential signal on the first electrode C11 of the first capacitor C1 is further increased due to the bootstrap effect and transmitted to the gate line G, thereby realizing an input of the first control signal value of low potential to the boost unit 200. The second control signal value of low potential is input to the boost unit 200, and a high potential is output from the boost unit 200 to the gate line G. The driving power consumption of the display panel can be saved through low-potential input and high-potential output, thereby ensuring normal driving of the display panel by a driving signal and display quality.

Optionally, as shown in FIGS. 1, 4, 7 and 12, the display panel 000 also includes a plurality of data lines S. The pixel unit 10 includes a switching transistor T0, a pixel electrode 101 and a common electrode 102. The gate of the switching transistor T0 is electrically connected to the gate line G, the source of the switching transistor T0 is electrically connected to the data line S, the drain of the switching transistor T0 is electrically connected to the pixel electrode 101, and the pixel electrode 101 is coupled to the common electrode 102. In the bootstrap stage J2, the potential value transmitted on the gate line G controls the switching transistor T0 to be turned on, and the potential value transmitted on the data line S is transmitted to the pixel electrode 101.

In the driving method provided by the embodiment, in the bootstrap stage J2, the potential value transmitted on the gate line G controls the switching transistor T0 to be turned on. The potential value transmitted on the data line S is transmitted to the pixel electrode 101. The gate of the switching transistor T0 of the pixel unit 10 is electrically connected to the gate line G, and the opening and closing of the switching transistor T0 is controlled by the potential signal transmitted on the gate line G. When the switching transistor T0 is turned on, the source of the switching transistor T0 and the drain of the switching transistor T0 are conductive, and the data potential signal transmitted on the data line S can be written into the pixel electrode 101 to form a grayscale potential required to display each grayscale of the image in each pixel unit 10. The pixel electrode 101 is coupled to the common electrode 102. The common electrode 102 is provided with a fixed common potential signal Vyom, and a driving electric field is formed between the pixel electrode 101 and the common electrode 102 to realize a display. The boost circuit 20 in the embodiment can realize an input of the first control signal value VL1 of low potential to the boost unit 200. The second control signal value VL2 of low potential is input to the boost unit 200, and the high potential is output from the boost unit 200 to the gate line G, so that the potential provided by the gate line G to the gate of the switching transistor T0 in the pixel unit 10 can be greater than the potential value written on the data line S, thereby ensuring normal conduction between the source and drain of the switching transistor T0 in the pixel unit 10, realizing charging of the pixel electrode 101 in the pixel unit 10 by the data line S, saving driving power consumption of the display panel through low-potential input, and also ensuring normal driving of the panel by a driving signal and ensuring the display quality.

Optionally, as shown in FIGS. 1,4, and 7-10, in the driving method provided by one embodiment, the boost unit 200 of the display panel 000 applying the driving method also includes a strobe module 204. A control end 204A of the strobe module 204 is electrically connected to the data line S, a first end 204B of the strobe module 204 is electrically connected to the second control signal line L2, and a second end 204C of the strobe module 204 is electrically connected to the first end 202B of the first module 202. The potential values transmitted on the data line S include the first data potential value Vdata1 and the second data potential value Vdata2. The first data potential value Vdata1 is negative, and the first data potential value Vdata1 is less than the second control signal value VL2. The second data potential value Vdata2 is positive, and the second data potential value Vdata2 is greater than the second control signal value VL2.

When the display panel 000 drives a display, the potential signals transmitted on the data line S includes a positive potential signal and a negative potential signal. That is, the potential values transmitted on the data line S include a negative first data potential value Vdata1 and a positive second data potential value Vdata2. In the bootstrap stage J2, when the potential value transmitted on the data line S is the first data potential value Vdata1, under the control of the first data potential value Vdata1 provided by the data line S, the first end 204B and the second end 204C of the strobe module 204 are disconnected. The potential value transmitted on the gate line G is equal to the first control signal value VL1. Therefore, there is no need to increase the potential of the gate line G to ensure that the switching transistor in the pixel unit 10 can be turned on normally, thereby saving driving power consumption. When the potential value transmitted on the data line S is the second data potential value Vdata2, under the control of the second data potential value Vdata2 provided by the data line S, the first end 204B and the second end 204C of the strobe module 204 are conductive. The second control signal value VL2 is transmitted to the second electrode C12 of the first capacitor C1. The second control signal value VL2 is greater than the first negative potential signal value VGL. The potential of the second electrode C12 of the first capacitor C1 is increased. The potential of the first electrode C11 of the first capacitor C1 is coupled by the second electrode C12 of the first capacitor C1. The potential of the first electrode C11 of the first capacitor C1 is further increased. The potential value transmitted on the gate line G is further increased to a third potential value, and the third potential value is greater than the first control signal value VL1. The third potential value is greater than the second data potential value Vdata2, ensuring that the switching transistor T0 of the pixel unit 10 can be turned on, and the potential of the first electrode C11 of the first capacitor C1 is coupled to a higher potential for secondary charging to third potential value. That is, the potential transmitted on the gate line G is also increased to the higher third potential value. Increasing the potential of the gate line G through the bootstrap stage J2 can ensure that the switching transistor in the pixel unit 10 can be turned on normally, thereby realizing low-potential input and high-potential output, which is conducive to saving power consumption and ensuring display quality.

Optionally, as shown in FIGS. 1 and 13-15, in one embodiment, in the driving method, the boost unit 200 of the display panel 000 applying the driving method also includes a reset module 205. A control end 205A of the reset module 205 is electrically connected to the third control signal line L3, a first end 205B of the reset module 205 is electrically connected to the gate line G, and a second end 205C of the reset module 205 is electrically connected to the first negative potential signal line L0. The driving method provided by the embodiment also includes a clearing stage J3. In the clearing stage J3, the third control signal line L3 provides the third control signal value VL3. The third control signal value VL3 controls the first end 205B and the second end 205C of the reset module 205 to be connected, the first negative potential signal value VGL is transmitted to the gate line G, and the switching transistor T0 is turned off.

The embodiment explains that the driving method of the display panel 000 also includes a clearing stage J3. In the clearing stage J3, the first control signal value VL1 provided by the first control signal line L1 is low, the second control signal value VL2 provided by the second control signal line L2 is low and the third control signal value VL3 provided by the third control signal line L3 is high. The charging module 201 and the initialization module 203 are not conductive under the control of the first control signal value VL1 of low potential. The first end 205B and the second end 205C of the reset module 205 are conductive under the control of the high-potential third control signal value VL3. The third control signal value VL3 provided on the third control signal line L3 controls whether a residual charge of the gate line G is discharged to the first negative potential signal line L0. After the bootstrap stage J2 of the boost circuit 20 is completed, the residual charge on the gate line G can be discharged to the first negative potential signal line L0, so that the switching transistor T0 of the pixel unit 10 is turned off, thereby realizing a clearing effect on the pixel unit 10 and preparing for the next frame, which is conducive to the display of the next frame. In the driving method of the embodiment, after the bootstrap stage J2 of the boost circuit 20 is completed, an arrangement of the clearing stage J3 can allow the residual charge of the gate line G to be discharged to the first negative potential signal line L0 to achieve a clearing effect on the pixel unit 10, which is conducive to a display of a next frame.

Optionally, as shown in FIGS. 1, 13-15, 18 and 19, in the driving method provided by one embodiment, the non-display area NA of the display panel 000 includes the first driving circuit 30. The first driving circuit 30 includes a low-potential signal end 30L, and the low-potential signal end 30L is electrically connected to the first end 205B of the reset module 205. In the clearing stage J3, the first driving circuit 30 works, and the low-potential signal end 30L outputs the first negative potential signal value VGL. In the charging stage J1 and the bootstrap stage J2, the low-potential signal end 30L outputs a floating signal.

The embodiment explains that the driving method of the display panel 000 also includes the clearing stage J3. In the clearing stage J3, the low-level signal end 30L connected to the first driving circuit 30 is connected to the first end 205B of the reset module 205. When the boost circuit 20 does not need a boosting operation (i.e., charging and bootstrapping operation are not required), the electric charge on the gate line G is effectively discharged to the low-potential signal end 30L of the first driving circuit 30 through a conduction of the first end 205B and the second end 205C of the reset module 205 to keep the potential of the gate line G stable and the switching transistor T0 in the pixel unit 10 continuously turned off. During the charging stage J1 and the bootstrap stage J2 of the boost circuit 20, the low-potential signal end 30L outputs a floating signal, which can prevent a signal of the low-potential signal end 30L of the first driving circuit 30 from affecting driving operation of the boost circuit 20.

Figure 24:
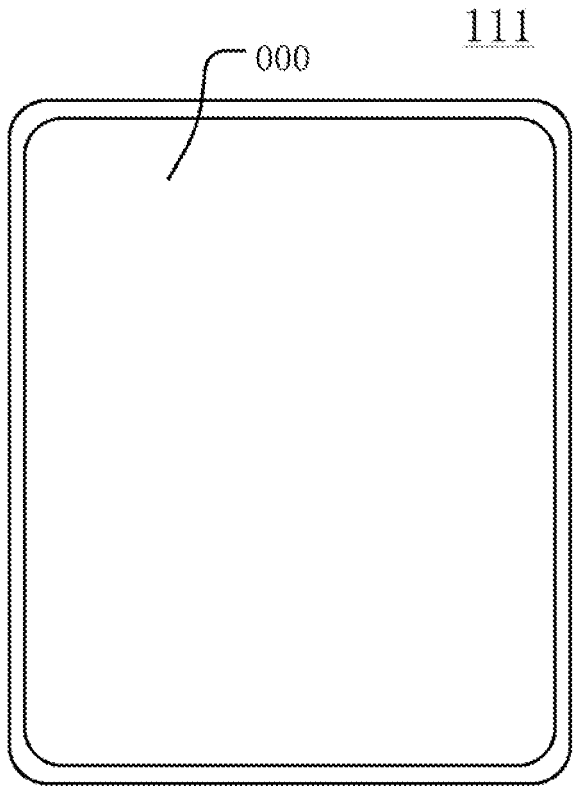
FIG. 24 illustrates a planar view of a display device consistent with various embodiments of the present disclosure.

FIG. 24 illustrates a planar view of a display device consistent with various embodiments of the present disclosure. Referring to FIG. 24, optionally, in one embodiment, a display device 111 includes the display panel 000 provided in the above embodiments. The embodiment in FIG. 24 only takes a mobile phone as an example to illustrate the display device 111. It can be understood that the display device 111 provided by the embodiment can be a computer, a television, a vehicle-mounted display device, or other display device 111 with a display function, which is not limited herein. The display device 111 has beneficial effects of the display panel 000 provided by the embodiments of the present disclosure. Details can be referred to specific descriptions of the display panel 000 in the above embodiments.

As disclosed, the display panel, the driving method thereof and display device provided by the present disclosure at least realize the following beneficial effects.

The display panel provided by the present disclosure includes a display area and a non-display area. The display area includes a plurality of pixel units and a plurality of gate lines, and the non-display area includes a boost circuit. Each boost unit in the boost circuit is configured to increase a potential transmitted on a gate line. When the boost unit works, the potential signal on the second electrode of the first capacitor is a smaller first negative potential signal value of negative value provided by the first negative potential signal line, and the potential signal value on the first electrode of the first capacitor is the first control signal value provided by the first control signal line. After the first control signal provided by the first control signal line further controls the conduction between the first end and the second end of the first module, the second control signal provided by the second control signal line can be transmitted to the second electrode of the first capacitor electrically connected to the second end of the first module, so that the potential signal value on the second electrode of the first capacitor is the larger second control signal value provided by the second control signal line. Since the second control signal value is greater than the first negative potential signal value, and the first capacitor has a bootstrap coupling effect, when the potential signal value on the second electrode of the first capacitor increases from a smaller first negative potential signal value to a larger second control signal value, the second electrode of the first capacitor is charged twice, and the potential signal value on the first electrode of the first capacitor further increases due to the bootstrap effect, so that the potential signal value on the first electrode of the first capacitor is increased from the first control signal value and transmitted to the gate line, thereby realizing the low-potential first control signal value to be input to the boost unit. The second control signal value of low potential is input to the boost unit, and the high potential is output from the boost unit to the gate line. Even if the potential value written on the data line is very high, the potential value transmitted to the pixel unit on the gate line can be ensured by the boost circuit to be relatively high, ensuring the normal transmission of the driving signal of the pixel unit. The boost circuit can ensure that the potential value transmitted to the pixel unit on the gate line is relatively high, thereby ensuring normal transmission of a driving signal to the pixel unit and display quality.

Although some specific embodiments of the present disclosure have been illustrated in detail through examples, A person skilled in the art should understand that the above examples are for illustration only and are not intended to limit the scope of the present disclosure. A person skilled in the art should understand that the above embodiments may be modified without departing from the scope and spirit of the present disclosure which are to be defined by the appended claims.

What is claimed is:

1. A display panel, comprising a display area and a non-display area, wherein:

the display area includes a plurality of pixel units, a plurality of data lines, and a plurality of gate lines electrically connected to the plurality of pixel units;

the non-display area includes a boost circuit including a plurality of boost units, a boost unit of the plurality of boost units is electrically connected to at least one of the plurality of gate lines;

the boost unit of the plurality of the boost units includes a charging module, a bootstrap module, and an initialization module that are electrically connected, the bootstrap module at least includes a first module and a first capacitor;

a control end of the charging module is electrically connected to a first control signal line, a first end of the charging module is electrically connected to the control end of the charging module, and a second end of the charging module is electrically connected to a gate line, a control end of the first module, and a first electrode of the first capacitor respectively;

a first end of the first module is electrically connected to a second control signal line, and a second end of the first module is electrically connected to a second electrode of the first capacitor;

a control end of the initialization module is electrically connected to the first control signal line, a first end of the initialization module is electrically connected to the second electrode of the first capacitor, and a second end of the initialization module is electrically connected to a first negative potential signal line;

a potential value provided by the second control signal line is greater than a potential value provided by the first negative potential signal line; and the boost unit also includes a strobe module, a control end of the strobe module is electrically connected to a data line, a first end of the strobe module is electrically connected to the second control signal line, and a second end of the strobe module is electrically connected to the first end of the first module.

2. The display panel according to claim 1, wherein:

the first control signal line provides a first control signal value, under a control of the first control signal value, the first end and the second end of the charging module are conductive, the first end and the second end of the initialization module are conductive, the first control signal value is transmitted to the gate line, the control end of the first module, and the first electrode of the first capacitor respectively, and the potential value provided by the first negative potential signal line is transmitted to the second electrode of the first capacitor;

under the control of the first control signal value, the first end and the second end of the first module are connected; and the second control signal line provides a second control signal value, the second control signal value is transmitted to the second electrode of the first capacitor, a potential of the second electrode of the first capacitor is increased, and a potential of the first electrode of the first capacitor is increased by coupling with the second electrode of the first capacitor.

3. The display panel according to claim 1, wherein:

the charging module includes a first transistor, the first module includes a second transistor, and the initialization module includes a third transistor;

a gate of the first transistor is electrically connected to the first control signal line, a source of the first transistor is electrically connected to the gate of the first transistor, a drain of the first transistor is electrically connected to the gate line, and a gate of the second transistor, and the first electrode of the first capacitor, respectively;

a source of the second transistor is electrically connected to the second control signal line, and a drain of the second transistor is electrically connected to the second electrode of the first capacitor; and a gate of the third transistor is electrically connected to the first control signal line, a source of the third transistor is electrically connected to the second electrode of the first capacitor, and a drain of the third transistor is electrically connected to the first negative potential signal line.

4. The display panel according to claim 1, wherein:

a potential value transmitted on the data line includes a first data potential value and a second data potential value;

the first data potential value is a negative value, and the first data potential value is less than a potential value provided by the second control signal line; and the second data potential value is a positive value, and the second data potential value is greater than the potential value provided by the second control signal line.

5. The display panel according to claim 1, wherein:

a pixel unit includes a switching transistor, a pixel electrode and a common electrode; and a gate of the switching transistor is electrically connected to the gate line, a source of the switching transistor is electrically connected to the data line, a drain of the switching transistor is electrically connected to the pixel electrode, and the pixel electrode is coupled to the common electrode.

6. The display panel according to claim 5, comprising a first substrate and a second substrate arranged oppositely, the first substrate including pixel electrodes, switching transistors, and the boost circuit, and the second substrate including common electrodes.

7. The display panel according to claim 5, wherein:

the boost unit also includes a reset module; and a control end of the reset module is electrically connected to a third control signal line, a first end of the reset module is electrically connected to the gate line, and a second end of the reset module is electrically connected to the first negative potential signal line.

8. The display panel according to claim 7, wherein:

the charging module includes a first transistor, the first module includes a second transistor, the initialization module includes a third transistor, the strobe module includes a fourth transistor, and the reset module includes a fifth transistor;

a gate of the first transistor is electrically connected to the first control signal line, a source of the first transistor is electrically connected to the gate of the first transistor, a drain of the first transistor is electrically connected to the gate line, a source of the fifth transistor, a gate of the second transistor, and the first electrode of the first capacitor;

a source of the second transistor is electrically connected to a drain of the fourth transistor, and a drain of the second transistor is electrically connected to the second electrode of the first capacitor and a source of the third transistor respectively;

a gate of the third transistor is electrically connected to the first control signal line, and a drain of the third transistor is electrically connected to the first negative potential signal line;

a gate of the fourth transistor is electrically connected to the data line, and a source of the fourth transistor is electrically connected to the second control signal line; and a gate of the fifth transistor is electrically connected to the third control signal line, and a drain of the fifth transistor is electrically connected to the first negative potential signal line.

9. The display panel according to claim 8, wherein the first transistor, the second transistor, the third transistor, the fourth transistor, the fifth transistor, and the switching transistor are of same type.

10. The display panel according to claim 8, wherein:

the first transistor, the second transistor, the third transistor, the fourth transistor, the fifth transistor, and the switching transistor are all N-type transistors; and the first control signal line, the second control signal line, and the third control signal line all provide a same high potential signal.

11. The display panel according to claim 8, wherein:

the first transistor, the second transistor, the third transistor, the fourth transistor, the fifth transistor, and the switching transistor are all P-type transistors; and the first control signal line, the second control signal line, and the third control signal line all provide a same low potential signal.

12. The display panel according to claim 7, wherein the non-display area includes a first driving circuit, the first driving circuit includes a low-potential signal end, and the low-potential signal end is electrically connected to the first end of the reset module.

13. The display panel according to claim 12, wherein the first driving circuit includes a gate driving circuit, the gate driving circuit includes a pull-down module, the pull-down module includes the low-potential signal end.

14. The display panel according to claim 1, wherein:

the strobe module includes a fourth transistor; and a gate of the fourth transistor is electrically connected to the data line, a source of the fourth transistor is electrically connected to the second control signal line, and a drain of the fourth transistor is electrically connected to the first end of the first module.

15. The display panel according to claim 1, wherein the non-display area includes a bonding area, the bonding area includes a plurality of conductive pads, and the plurality of gate lines is electrically connected to the plurality of conductive pads.

16. The display panel according to claim 1, wherein:

the plurality of gate lines extends along a first direction, and along the first direction, the non-display area includes a first non-display area and a second non-display area on opposite sides of the display area; and the boost circuit is in the first non-display area and/or the second non-display area.

17. A display panel, comprising a display area and a non-display area, wherein:

the display area includes a plurality of pixel units and a plurality of gate lines electrically connected to pixel units;

the non-display area includes a potential boost circuit including a plurality of boost units, a boost unit of the plurality of the boost units is electrically connected to at least one of the plurality of gate lines;

the boost unit of the plurality of the boost units includes a first transistor, a second transistor, a third transistor and a first capacitor that are electrically connected;

a gate of the first transistor is electrically connected to a first control signal line, a source of the first transistor is electrically connected to the gate of the first transistor, a drain of the first transistor is electrically connected to the gate line, a gate of the second transistor, and a first electrode of the first capacitor, respectively;

a source of the second transistor is electrically connected to a second control signal line, and a drain of the second transistor is electrically connected to a second electrode of the first capacitor;

a gate of the third transistor is electrically connected to the first control signal line, a source of the third transistor is electrically connected to the drain of the second transistor, and a drain of the third transistor is electrically connected to a first negative potential signal line;

a potential value provided by the second control signal line is greater than a potential value provided by the first negative potential signal line;

the boost unit further includes a fourth transistor; and a gate of the fourth transistor is electrically connected to a data line, a source of the fourth transistor is electrically connected to the second control signal line, and a drain of the fourth transistor is electrically connected to the source of the second transistor.

18. The display panel according to claim 17, wherein:

the boost unit also includes a fifth transistor; and a gate of the fifth transistor is electrically connected to a third control signal line, a source of the fifth transistor is electrically connected to the drain of the first transistor, and a drain of the fifth transistor is electrically connected to the first negative potential signal line.

* * * * *